(12) United States Patent
Sugiura et al.

(10) Patent No.: US 7,938,914 B2
(45) Date of Patent: May 10, 2011

(54) WORKPIECE SURFACE TREATMENT SYSTEM

(75) Inventors: Yutaka Sugiura, Hirakata (JP); Ryosuke Hamada, Hirakata (JP); Tetsuro Uemura, Hirakata (JP); Hideki Nakada, Hirakata (JP)

(73) Assignee: C. Uyemura & Co., Ltd., Osaka-shi (JP)

( * ) Notice: Subject to any disclaimer, the term of this patent is extended or adjusted under 35 U.S.C. 154(b) by 390 days.

(21) Appl. No.: 12/133,871

(22) Filed: Jun. 5, 2008

(65) Prior Publication Data

US 2008/0302396 A1  Dec. 11, 2008

(30) Foreign Application Priority Data

Jun. 6, 2007  (JP) ............................... P2007-150494

(51) Int. Cl.
*B08B 3/02* (2006.01)

(52) U.S. Cl. .................... 134/64 R; 134/77; 134/122 R; 134/902

(58) Field of Classification Search ............... 134/76, 134/77, 902, 200, 64 R, 122 R
See application file for complete search history.

(56) References Cited

U.S. PATENT DOCUMENTS

| | | | | |
|---|---|---|---|---|
| 2,351,453 A | * | 6/1944 | Pearl | 451/85 |
| 3,335,839 A | * | 8/1967 | Neumann | 134/76 |
| 3,645,283 A | * | 2/1972 | Cassells | 134/58 DL |
| 3,664,355 A | * | 5/1972 | Adams | 134/143 |
| 4,411,357 A | * | 10/1983 | Caddell | 198/802 |
| 4,653,518 A | * | 3/1987 | Adachi | 134/62 |
| 4,665,655 A | * | 5/1987 | Woodard | 451/67 |
| 4,772,357 A | * | 9/1988 | Carlson et al. | 216/84 |
| 5,025,280 A | * | 6/1991 | Lamb et al. | 396/571 |
| 5,086,794 A | * | 2/1992 | Guerinat et al. | 134/56 R |
| 5,168,886 A | * | 12/1992 | Thompson et al. | 134/153 |
| 5,240,686 A | * | 8/1993 | Harlegard | 422/300 |

(Continued)

FOREIGN PATENT DOCUMENTS

DE  1 771 713  2/1972

(Continued)

OTHER PUBLICATIONS

European Search Report dated Oct. 28, 2008 (Seven (7) pages).

*Primary Examiner* — Frankie L Stinson
(74) *Attorney, Agent, or Firm* — Crowell & Moring LLP

(57) ABSTRACT

A workpiece surface treatment system (1), which obtains a surface-treated workpiece by sequentially carrying a treatment cell (9) containing a workpiece to a series of apparatuses for operations in the respective apparatuses, is characterized by including: a carrying apparatus (2) for sequentially carrying the treatment cell (9) to a series of the apparatuses in the system; a carrying-in/out apparatus (3) for carrying the treatment cell in and out of the carrying apparatus; a surface treatment apparatus (4) for performing a surface treatment on the workpiece by receiving the treatment cell from the carrying apparatus and supplying a surface treatment liquid to the inside of the treatment cell while rotating the treatment cell; and a workpiece collection apparatus (5) for collecting the workpiece by receiving the treatment cell from the carrying apparatus, inverting the treatment cell, and squirting the inside of the treatment cell with water from below to flow out the workpiece, wherein the carrying apparatus carries the treatment cell to the surface treatment apparatus, and then to the workpiece collection apparatus.

4 Claims, 30 Drawing Sheets

U.S. PATENT DOCUMENTS

| | | | |
|---|---|---|---|
| 5,313,966 A * | 5/1994 | Sadamori | 134/76 |
| 5,879,520 A | 3/1999 | Griego | |
| 5,967,159 A * | 10/1999 | Tateyama | 134/61 |
| 6,090,711 A * | 7/2000 | Batz et al. | 438/689 |
| 6,263,887 B1 * | 7/2001 | Dunn | 134/22.18 |
| 6,358,388 B1 * | 3/2002 | Bleck et al. | 205/118 |
| 6,565,722 B1 | 5/2003 | Hillebrand et al. | |
| 7,025,862 B2 * | 4/2006 | Herchen et al. | 204/297.06 |
| 7,138,016 B2 * | 11/2006 | Reardon et al. | 118/313 |

FOREIGN PATENT DOCUMENTS

| | | | |
|---|---|---|---|
| EP | 0 950 730 A2 | | 10/1999 |
| JP | 10-027770 | * | 1/1998 |
| JP | 11-505295 A | | 5/1999 |
| JP | 2000-135476 | * | 5/2000 |
| WO | WO 96/37638 A1 | | 11/1996 |
| WO | WO 00/06810 A1 | | 2/2000 |
| WO | WO 2004/110698 A2 | | 12/2004 |

* cited by examiner

US 7,938,914 B2

WORKPIECE SURFACE TREATMENT SYSTEM

TECHNICAL FIELD

The present invention relates to a workpiece surface treatment system for obtaining a surface-treated workpiece by sequentially carrying a treatment cell containing a workpiece to a series of apparatuses for operations in the respective apparatuses. Examples of workpieces include small objects (small components) such as a powdery work having a size of 0.5 to 5000 μm, a chip capacitor, a diode, a connector, a reed switch, a nail, a bolt, a nut, and a washer. Furthermore, surface treatment includes: (1) an electroplating process; (2) an electroless plating process, e.g., an immersion plating process or a chemical plating process; (3) a composite plating process or a chemical composite plating process; (4) an electrodeposition coating process, e.g., an anion electrodeposition coating process or a cation electrodeposition coating process; (5) a pretreatment, e.g., a degreasing process, an electrolytic degreasing process, a barrel polishing process, an alkaline immersion cleaning process, a pickling process, an acid electrolytic process, a chemical polishing process, an electropolishing process, or a neutralization process; and (6) a post treatment, e.g., a draining-induced tarnish prevention process, a water-soluble resin process, or a chromate process.

BACKGROUND ART

As surface treatment apparatuses for surface-treating workpieces, apparatuses described in Patent Documents 1 and 2, for example, are known. In each of these apparatuses, in a state where a treatment cell is placed on a receiving plate, the surface treatment and/or water rinsing of a workpiece are/is performed, or the cleaning or the like of the treatment cell is carried out.

[Patent Document 1] Japanese translation of PCT international application No. 11-505295.
[Patent Document 2] U.S. Pat. No. 5,879,520.

DISCLOSURE OF THE INVENTION

Problems to be Solved by the Invention

However, in each of the above-mentioned conventional apparatuses, since various processes such as surface treatment and water rinsing are carried out by a single apparatus, the efficiency is low, and furthermore, the respective processes themselves might be insufficient.

Therefore, there have been demands for a surface treatment system capable of carrying out respective processes by separate apparatuses in an assembly line manner.

Solution to the Problems

A first invention of the present application provides a workpiece surface treatment system for obtaining a surface-treated workpiece by sequentially carrying a treatment cell containing a workpiece to a series of apparatuses for operations in the respective apparatuses, the system characterized by including: a carrying apparatus for sequentially carrying the treatment cell to a series of the apparatuses in the system; a carrying-in/out apparatus for carrying the treatment cell in the carrying apparatus, and for carrying the treatment cell out of the carrying apparatus; a surface treatment apparatus for performing a surface treatment on the workpiece by receiving the treatment cell from the carrying apparatus and supplying a surface treatment liquid to the inside of the treatment cell while rotating the treatment cell; and a workpiece collection apparatus for collecting the workpiece by receiving the treatment cell from the carrying apparatus, inverting the treatment cell, and squirting the inside of the treatment cell with water from below to flow out the workpiece, wherein the carrying apparatus carries the treatment cell to the surface treatment apparatus, and then to the workpiece collection apparatus.

In the above-described first invention, the following structures (i) and (ii) are preferably further adopted.

(i) The system further includes: a stripping apparatus for performing a stripping process on an inner face of the treatment cell by receiving the treatment cell from the carrying apparatus, and supplying a stripping liquid to the inside of the treatment cell while rotating the treatment cell; and a water rinsing apparatus for water-rinsing the inside of the treatment cell by receiving the treatment cell from the carrying apparatus, inverting the treatment cell, and squirting the inside of the treatment cell with water from below, wherein the carrying apparatus carries the treatment cell to the surface treatment apparatus, to the workpiece collection apparatus, to the stripping apparatus, and then to the water rinsing apparatus.

(ii) The system includes a plurality of the surface treatment apparatuses.

A second invention of the present application provides a carrying apparatus characterized in that the apparatus includes: a horizontal rail part; and an actuation part that is moved on the rail part, that the actuation part includes: a base portion that slides on the rail part; a vertical post portion extending upward from the base portion; and a gripping portion that is moved up and down along the post portion, and that the gripping portion is formed so as to hold and release a treatment cell.

A third invention of the present application provides a workpiece collection apparatus characterized in that the apparatus includes: a receiving plate on which a treatment cell is placed; a hopper for covering, from above, the treatment cell placed on the receiving plate; and inverting means for inverting the hopper covering the treatment cell, together with the receiving plate and the treatment cell, and that the apparatus is formed so as to squirt the inside of the inverted treatment cell with water from an ejection part provided at the hopper and allow a workpiece inside the treatment cell to be washed into the hopper and to be discharged from the hopper to a collection vessel, thereby collecting the workpiece.

A fourth invention of the present application provides a water rinsing apparatus characterized in that the apparatus includes: a receiving plate on which a treatment cell is placed; fixing means for fixing the treatment cell onto the receiving plate; inverting means for inverting both of the receiving plate and the treatment cell; and a hopper for covering the inverted treatment cell from below, and that the apparatus is formed so as to squirt the inside of the inverted treatment cell with water from an ejection part, thereby water-rinsing the inside of the treatment cell.

EFFECT OF THE INVENTION

In the first invention of the present application, a surface treatment on a workpiece, and a process of collecting the surface-treated workpiece can be performed in an assembly line manner by the separate apparatuses. Accordingly, the surface-treated workpiece can be efficiently obtained on the whole, and furthermore, the surface treatment itself and the collection process itself can be sufficiently performed.

Moreover, it is hard to take out a surface-treated workpiece because it is wet and is therefore adhered to an inner face of the treatment cell; however, in the present invention, since the workpiece collection apparatus inverts the treatment cell and squirts the treatment cell with water from below, it is possible to flow down the workpiece together with water, and accordingly, the workpiece can be collected efficiently.

In the above-described structure (i), a cleaned treatment cell can be obtained. Further, if the treatment cell is water-rinsed without inverting the treatment cell, water is accumulated inside the treatment cell; however, in the present invention, since the water rinsing apparatus inverts the treatment cell and squirts the treatment cell with water from below, it is possible to immediately flow down dirt or the like inside the treatment cell together with water. Thus, a state in which water is ejected directly to the inner surface of the treatment cell can be continued, and accordingly, the cleaning effect due to the water rinsing can be improved.

In the above-described structure (ii), different surface treatments can be carried out by the respective surface treatment apparatuses. Accordingly, two or more treatment films can be formed on the surface of a workpiece.

Furthermore, since workpieces are treated simultaneously by a plurality of the surface treatment apparatuses, a larger number of workpieces can be treated compared with the case where workpieces are treated by a single surface treatment apparatus.

In the second invention of the present application, the treatment cell can be carried by a simple operation.

In the third invention of the present application, a surface-treated workpiece can be collected by a simple operation. Further, since a workpiece inside the treatment cell is received by the hopper, the workpiece can be prevented from being flown away, and accordingly, the workpiece can be collected in the collection vessel with certainty.

In the fourth invention of the present application, the treatment cell used for a surface treatment can be cleaned by a simple operation. Further, since water flowing down from the treatment cell is received by the hopper, the water can be prevented from being scattered, and accordingly, the periphery of the water rinsing apparatus can be prevented from being contaminated. In particular, a hazardous stripping liquid such as nitric acid is attached to the inner face of the treatment cell that has been carried from the stripping apparatus, and therefore, water containing the stripping liquid is prevented from being scattered, thus making it possible to prevent the periphery of the water rinsing apparatus from being contaminated by the stripping liquid.

BEST MODE FOR CARRYING OUT THE INVENTION

First Embodiment (1) Overall Structure

Figure 1:
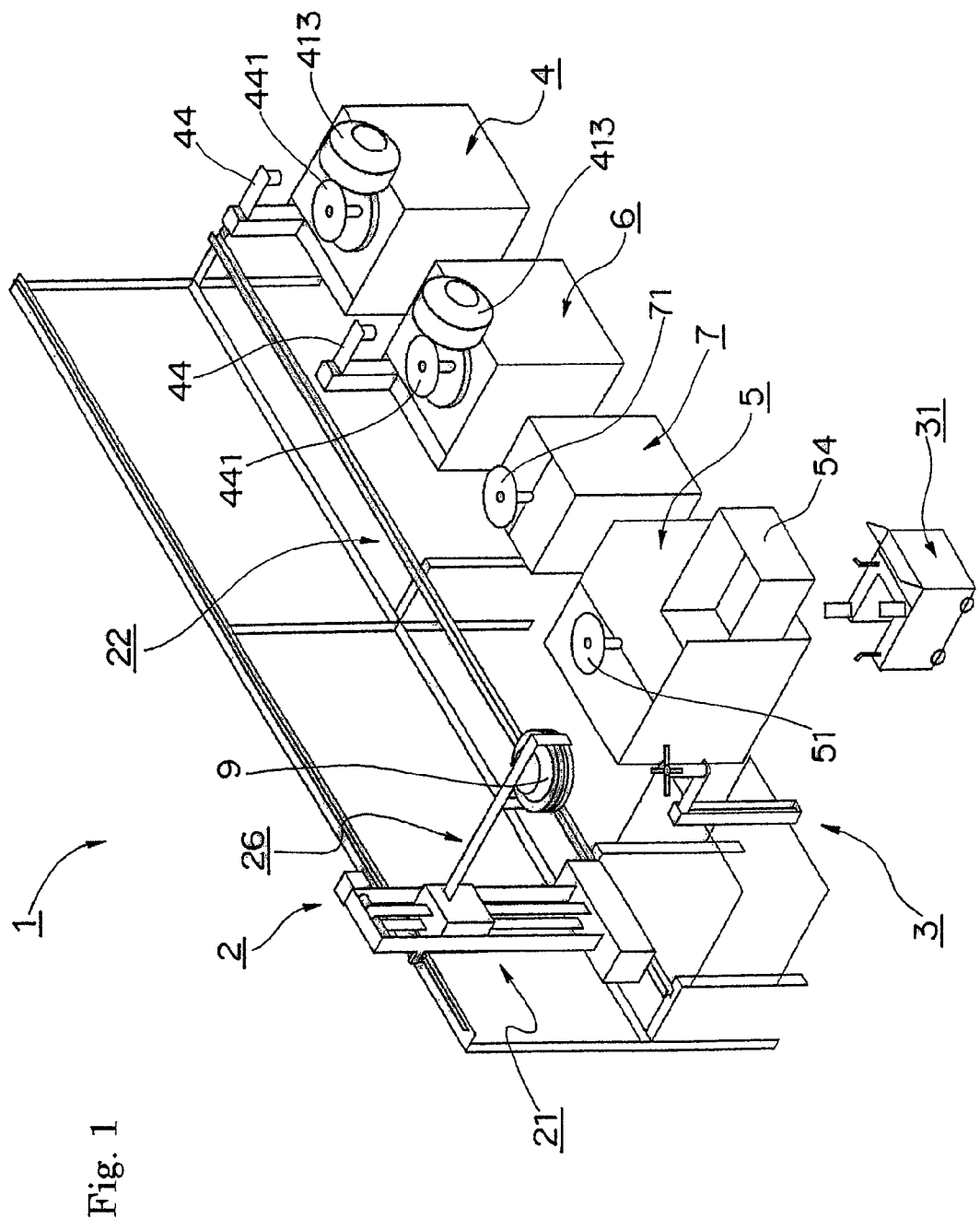
FIG. 1 A perspective view showing a workpiece surface treatment system according to a first embodiment of the present invention.

FIG. 1 is a perspective view showing a workpiece surface treatment system according to a first embodiment of the present invention. This system 1 includes a carrying apparatus 2, a carrying-in/out apparatus 3, a surface treatment apparatus 4, a workpiece collection apparatus 5, a stripping apparatus 6, and a water rinsing apparatus 7. As a workpiece, a chip capacitor, for example, is used. As a surface treatment, a nickel plating process, for example, is performed.

Figure 2:
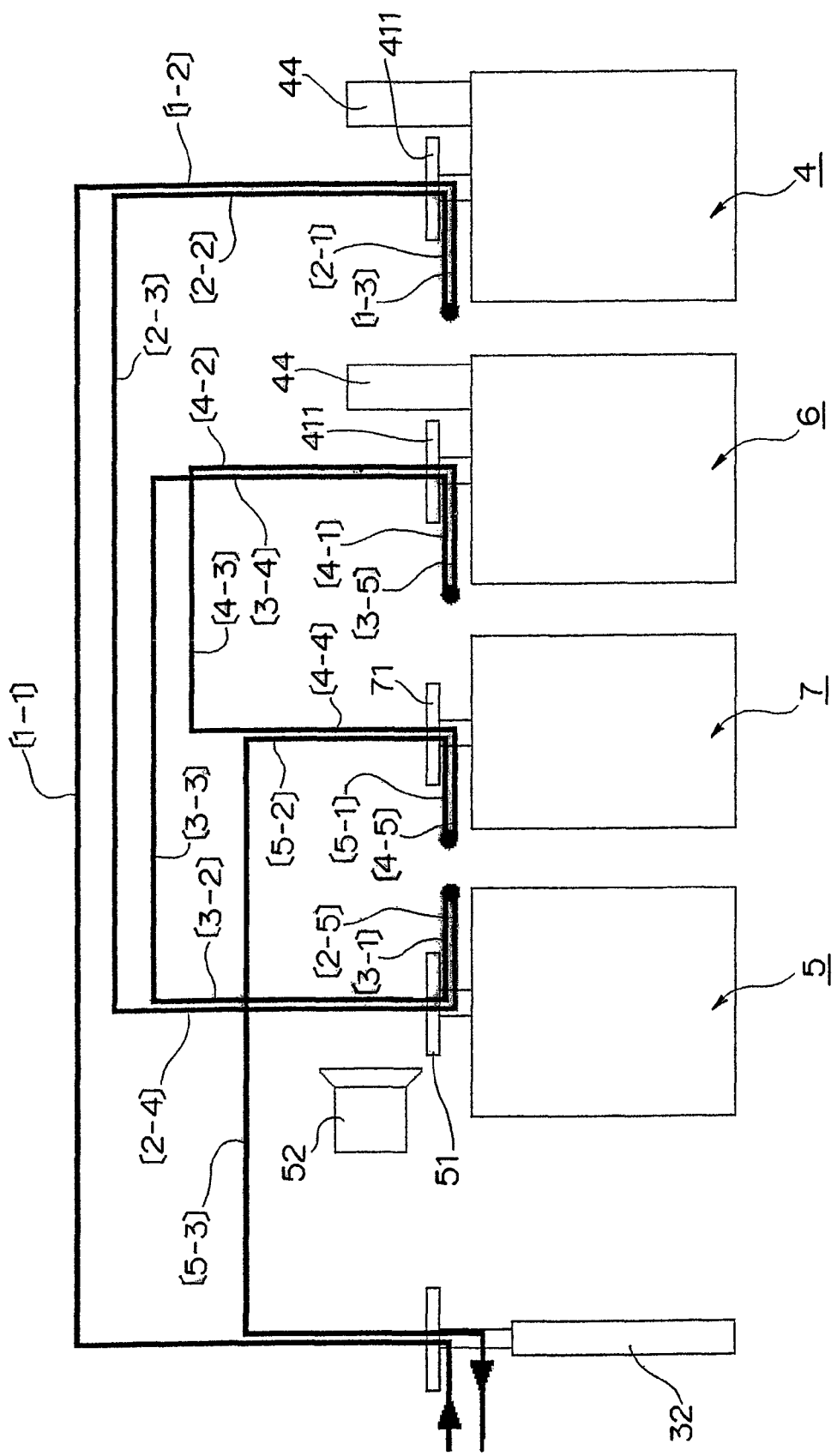
FIG. 2 A diagram showing operational paths of a carrying apparatus of the system shown in FIG. 1.

The carrying apparatus 2 sequentially carries a treatment cell 9 to a series of the apparatuses 4, 5, 6 and 7 in the system 1. Specifically, as shown in FIG. 2, the carrying apparatus 2 carries the treatment cell 9 to the surface treatment apparatus 4, the workpiece collection apparatus 5, the stripping apparatus 6, and the water rinsing apparatus 7 in this order.

The carrying-in/out apparatus 3 carries the treatment cell 9 in the carrying apparatus 2, and carries the treatment cell 9 out of the carrying apparatus 2. The carrying-in/out apparatus 3 includes a carrying cart 31.

The surface treatment apparatus 4 receives the treatment cell 9 from the carrying apparatus 2, and supplies a surface treatment liquid to the inside of the treatment cell 9 while rotating the treatment cell 9, thereby performing a surface treatment on a workpiece.

The workpiece collection apparatus 5 receives the treatment cell 9 from the carrying apparatus 2, inverts the treatment cell 9, and squirts the inside of the treatment cell 9 with water from below to flow out the workpiece, thereby collecting the workpiece.

The stripping apparatus 6 receives the treatment cell 9 from the carrying apparatus 2, and supplies a stripping liquid to the inside of the treatment cell 9 while rotating the treatment cell 9, thereby performing a stripping process on an inner face of the treatment cell 9.

The water rinsing apparatus 7 receives the treatment cell 9 from the carrying apparatus 2, inverts the treatment cell 9, and squirts the inside of the treatment cell 9 with water from below, thereby water-rinsing the inside of the treatment cell 9.

(2) Carrying-In/Out Apparatus 3

Figure 3:
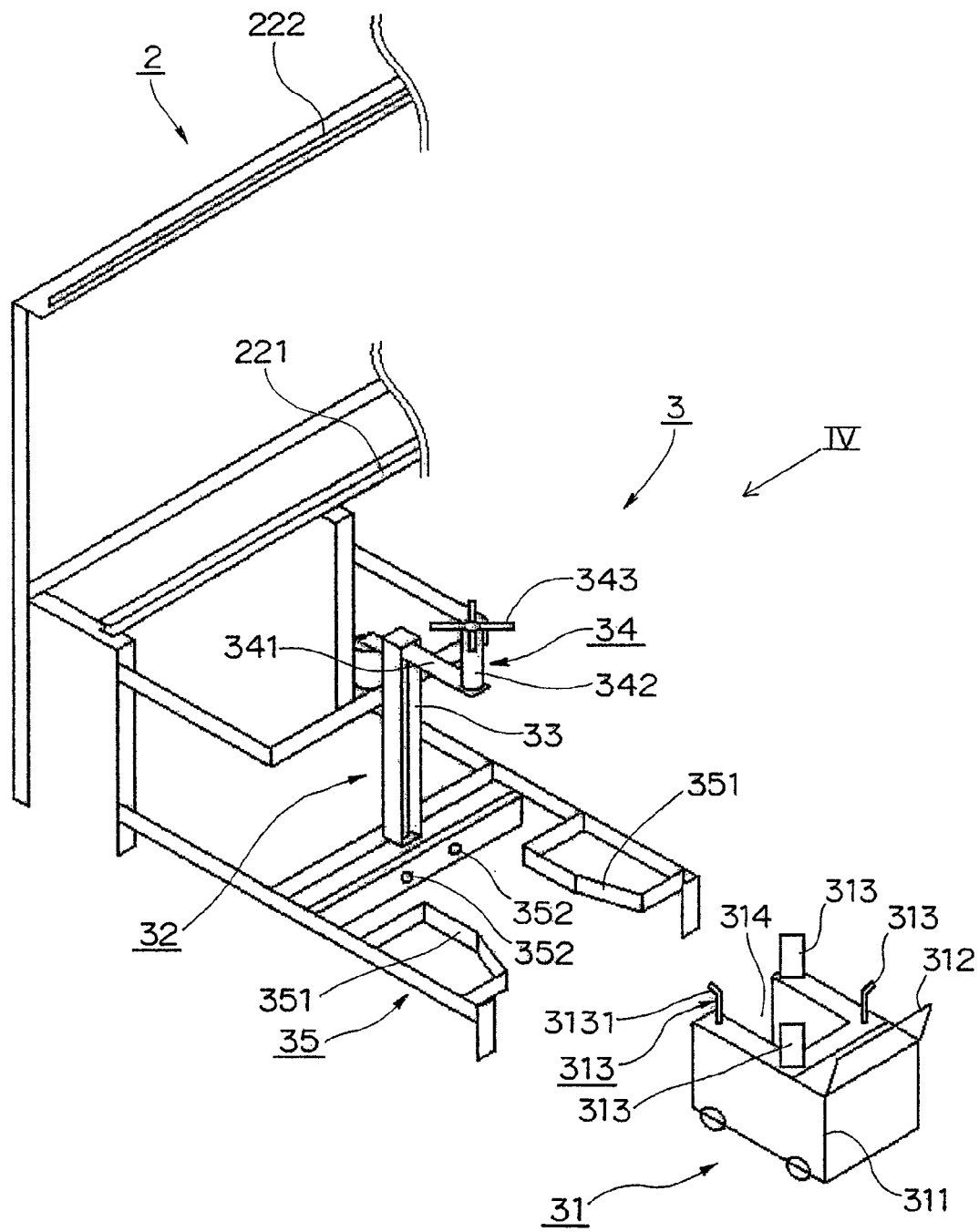
FIG. 3 A perspective view showing a carrying-in/out apparatus.

FIG. 3 is a perspective view showing a carrying-in/out apparatus 3. The carrying-in/out apparatus 3 includes: a receiving part 32 provided at an end of the carrying apparatus 2; and the carrying cart 31 connectable to the receiving part 32. The receiving part 32 includes: a support post 33 that is vertically provided; a placement portion 34 movable up and down along the support post 33; and guide portions 35 for guiding the carrying cart 31 to a predetermined position adjacent to the support post 33.

The carrying cart 31 consists of a frame body 311 assembled into an approximately rectangular parallelopiped form, and has a handle 312. The carrying cart 31 is provided, at four positions of its upper face, with support pieces 313 for supporting the treatment cell 9. Upper end portions 3131 of the support pieces 313 are outwardly bent, and thus the treatment cell 9 is supported from below by the upper end portions 3131 of the four support pieces 313. A portion surrounded by the four support pieces 313 downwardly has a space 314 in which the placement portion 34 can be contained so as to be movable up and down.

The guide portions 35 have guide plates 351 that abut against the carrying cart 31 from both sides. The guide portions 35 guide the carrying cart 31 until it abuts against stoppers 352, thereby positioning the space 314 within the range in which the placement portion 34 is moved up and down.

Figure 4:
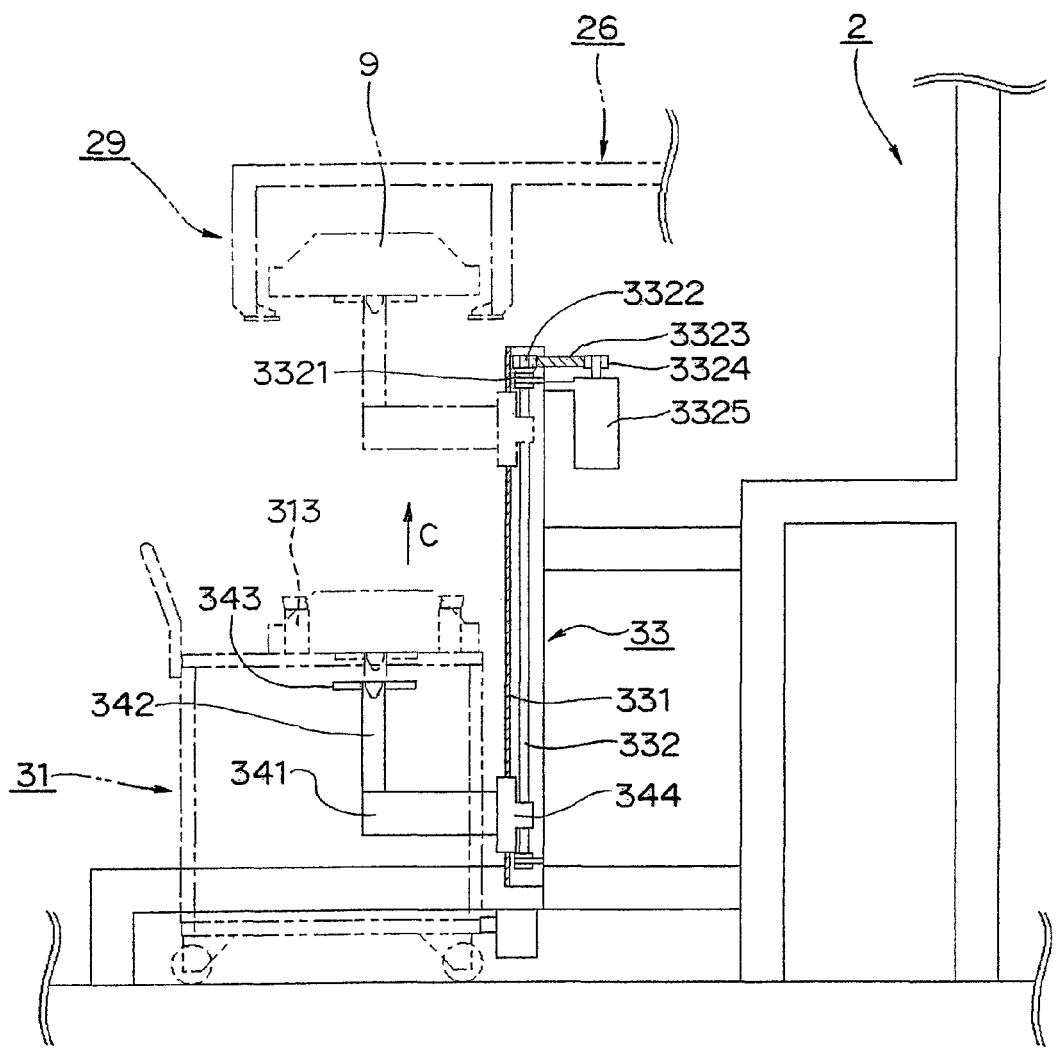
FIG. 4 A longitudinal cross-sectional view seen from the arrow IV shown in FIG. 3.

The placement portion 34 is composed of: a horizontal arm 341 whose one end is connected to the support post 33; a vertical arm 342 extending upward from the other end of the horizontal arm 341; and bars 343 extending horizontally and crisscross from an upper edge of the vertical arm 342. The bars 343 are each extended to a length that allows the treatment cell 9 to be placed thereon. As shown in FIG. 4 serving as a longitudinal cross-sectional view seen from the arrow IV of FIG. 3, an end 344 of the horizontal arm 341 is connected to the support post 33 so as to be slidingly moved up and down along a rail 331 of the support post 33. It should be noted that since an upper end of the vertical arm 342 is formed with a concave portion into which a convex portion 902 of the treatment cell 9 is fitted, the treatment cell 9 can be placed at the center of the vertical arm 342. Accordingly, the position of the treatment cell 9 with respect to the carrying apparatus 2 can be determined with high precision, and hence the treatment cell 9 can be gripped by the carrying apparatus 2 with certainty.

A chain 332 is put across the support post 33 vertically. The end 344 of the horizontal arm 341 is connected to the chain 332. A drive gear 3321 for the chain 332 is connected to a motor 3325 via a gear 3322, a chain 3323 and a gear 3324. Thus, the chain 332 is driven so as to be moved up and down together with the end 344 of the horizontal arm 341.

(3) Carrying Apparatus 2

Figure 5:
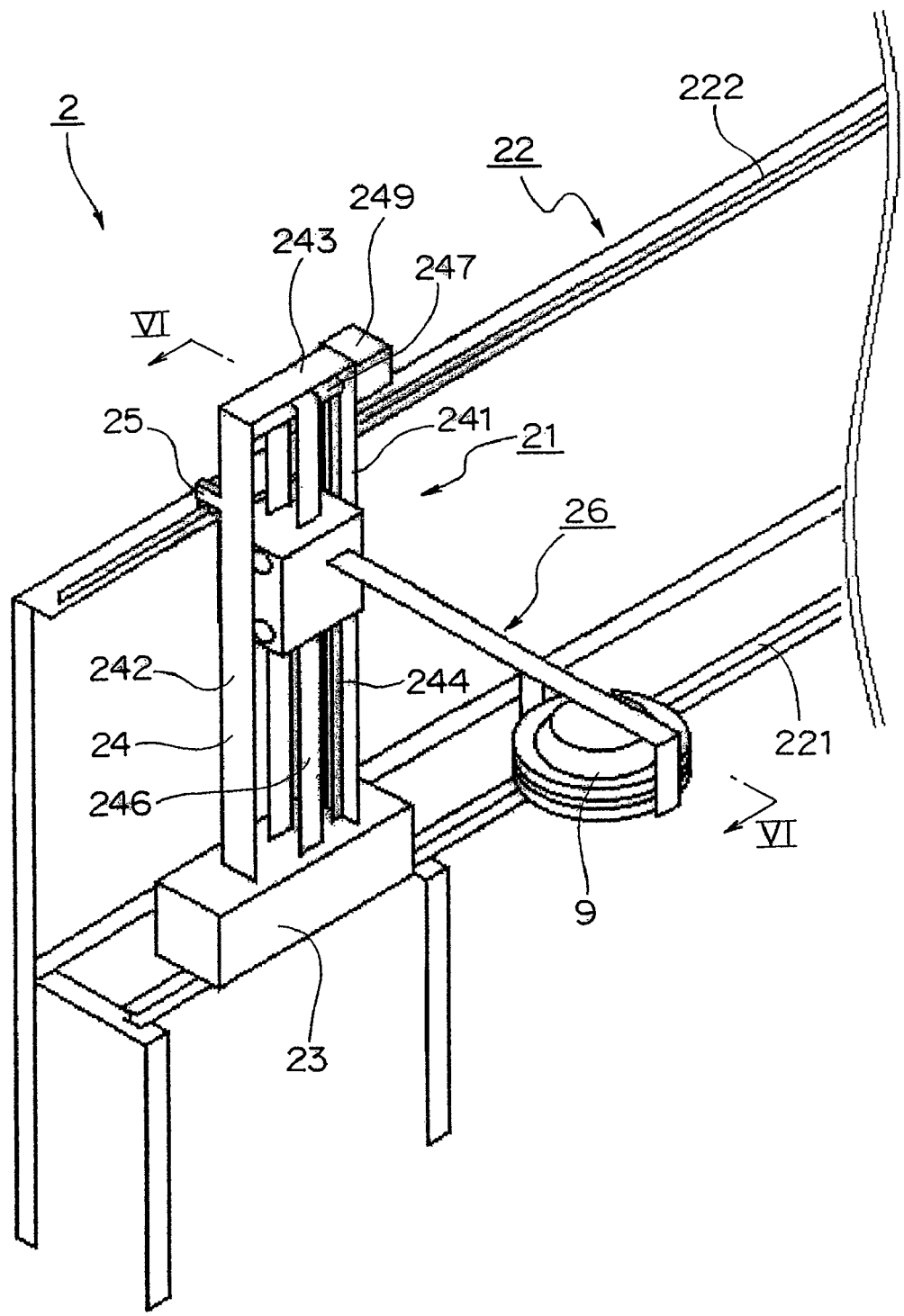
FIG. 5 A partial perspective view of the carrying apparatus.

FIG. 5 is a partial perspective view of the carrying apparatus 2. The carrying apparatus 2 includes an actuation part 21 and a rail part 22. The rail part 22 has a horizontal lower rail 221 and a horizontal upper rail 222.

The actuation part 21 includes: a base portion 23 that slides on the lower rail 221; a vertical post portion 24 extending upward from the base portion 23; and a gripping portion 26 that is moved up and down along the post portion 24. It should be noted that the post portion 24 includes a support portion 25 that is extended horizontally from the post portion 24 and moved on the upper rail 222.

Figure 6:
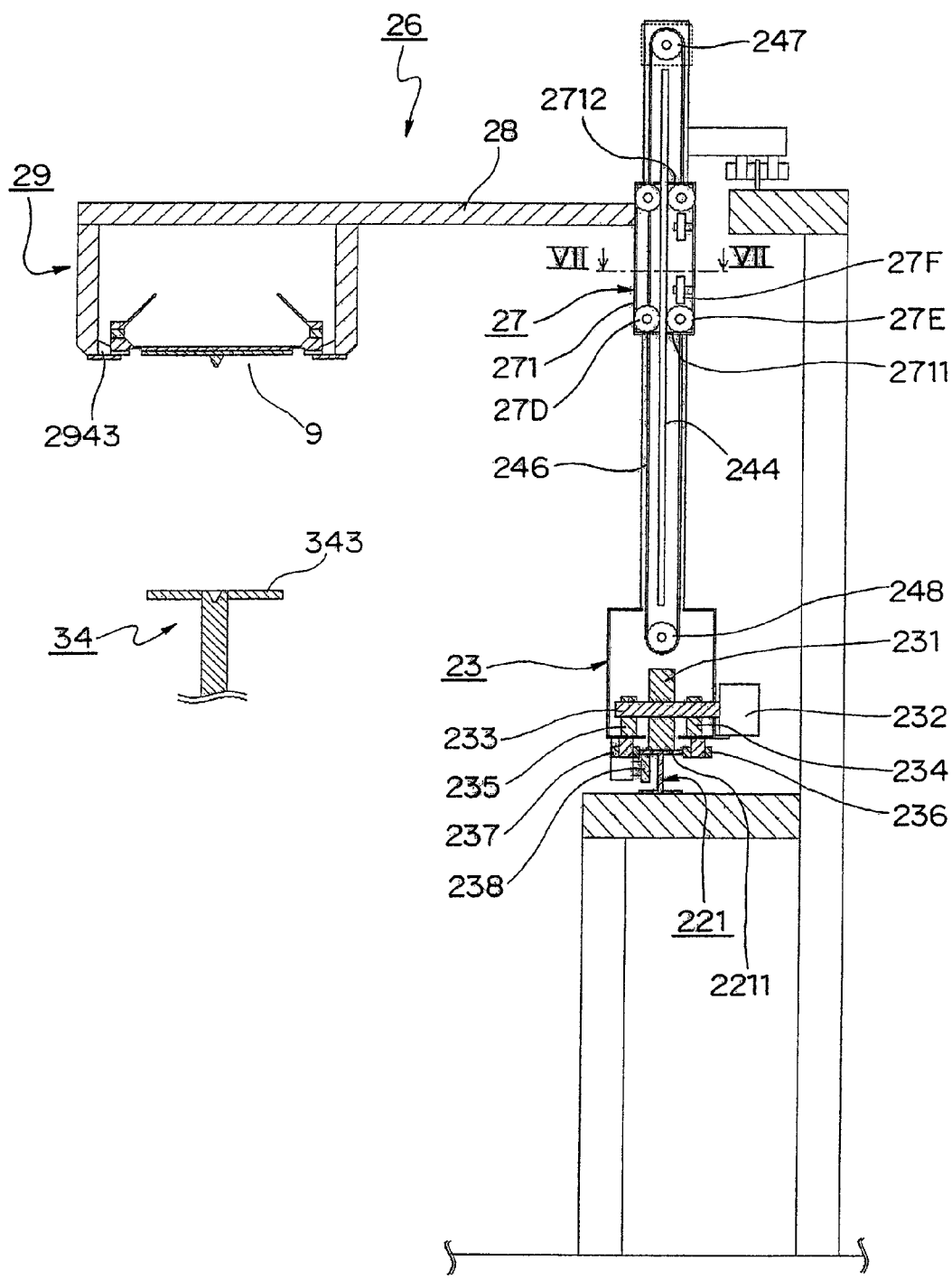
FIG. 6 A cross-sectional view taken along the lines VI-VI shown in FIG. 5.

FIG. 6 is a cross-sectional view taken along the lines VI-VI shown in FIG. 5. The base portion 23 is formed into a box body. The base portion 23 internally has a drive wheel 231 that abuts, from above, against a horizontal plate portion 2211 of the lower rail 221. The wheel 231 is connected to a driving shaft 233 extending from a motor 232 externally attached to the base portion 23. The driving shaft 233 is supported by two bearings 234 and 235. The base portion 23 is provided at its lower face with: rollers 236 and 237 that abut, from both sides, against both edges of the horizontal plate portion 2211; and a roller 238 that abuts against a lower face of the horizontal plate portion 2211. Upon actuation of the motor 232, the base portion 23 slides on the lower rail 221 due to the rotation of the wheel 231 while being supported by the rollers 236, 237 and 238 with respect to the lower rail 221.

The post portion 24 is formed by connecting two vertical longitudinal plates 241 and 242, which are arranged at an interval from each other, with a top plate 243. The two longitudinal plates 241 and 242 are arranged at an interval from each other along the lower rail 221, parallel with respect to each other, and opposed to each other. The longitudinal plate 241 has, at the widthwise center of its inner face, a longitudinally extending plate-like rail 244. The longitudinal plate 242 similarly has a plate-like rail 245. The rail 244 and the rail 245 are opposed to each other. Between the two longitudinal plates 241 and 242, a chain 246 is provided so as to be rotated longitudinally. The chain 246 is put across an upper driving shaft 247 and a lower driven shaft 248. The driving shaft 247 is connected to a motor 249 externally attached to the post portion 24.

The gripping portion 26 includes: a connection portion 27 connected to the post portion 24; an arm 28 extending horizontally from the connection portion 27; and a holding portion 29, provided at a front end of the arm 28, for holding the treatment cell 9.

Figure 7:
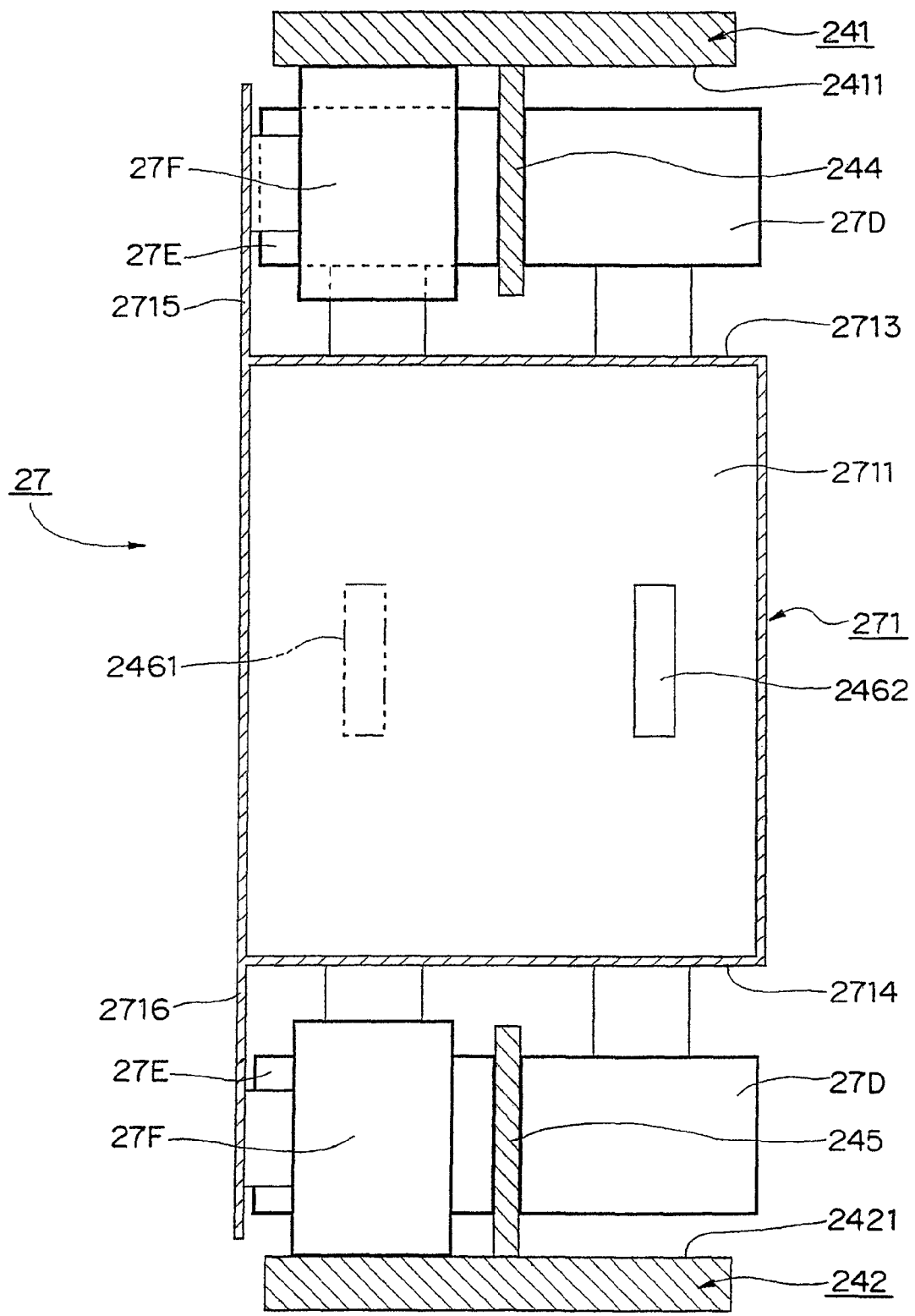
FIG. 7 A cross-sectional view seen from the arrows VII-VII shown in FIG. 6.

The connection portion 27 is located at an inner space of the post portion 24, and is formed by a box body 271 and a large number of rollers. FIG. 7 is a cross-sectional view seen from the arrows VII-VII shown in FIG. 6. A bottom plate 2711 of the box body 271 is formed with: a fixation portion 2461 to which the chain 246 is fixed; and a through hole 2462 through which the chain 246 passes. A top plate 2712 of the box body 271 is formed with two through holes (not shown) through which the chain 246 passes. Both lateral plates 2713 and 2714 of the box body 271 are each provided with six rollers. The lateral plate 2713 is provided at its upper portion with rollers 27A, 27B and 27C, and is provided at its lower portion with rollers 27D, 27E and 27F. The rollers 27A and 27B abut against the rail 244 from both sides. The roller 27C is provided at a flange 2715 of the box body 271, and abuts against an inner face 2411 of the longitudinal plate 241. The rollers 27D and 27E abut against the rail 244 from both sides. The roller 27F is provided at the flange 2715 of the box body 271, and abuts against the inner face 2411 of the longitudinal plate 241. The lateral plate 2714 is similarly provided with six rollers 27A, 27B, 27C, 27D, 27E and 27F. Specifically, the rollers 27A and 27B abut against the rail 245 from both sides. The roller 27C is provided at a flange 2716 of the box body 271, and abuts against an inner face 2421 of the longitudinal plate 242. The rollers 27D and 27E abut against the rail 245 from both sides. The roller 27F is provided at the flange 2716 of the box body 271, and abuts against the inner face 2421 of the longitudinal plate 242.

Figure 8:
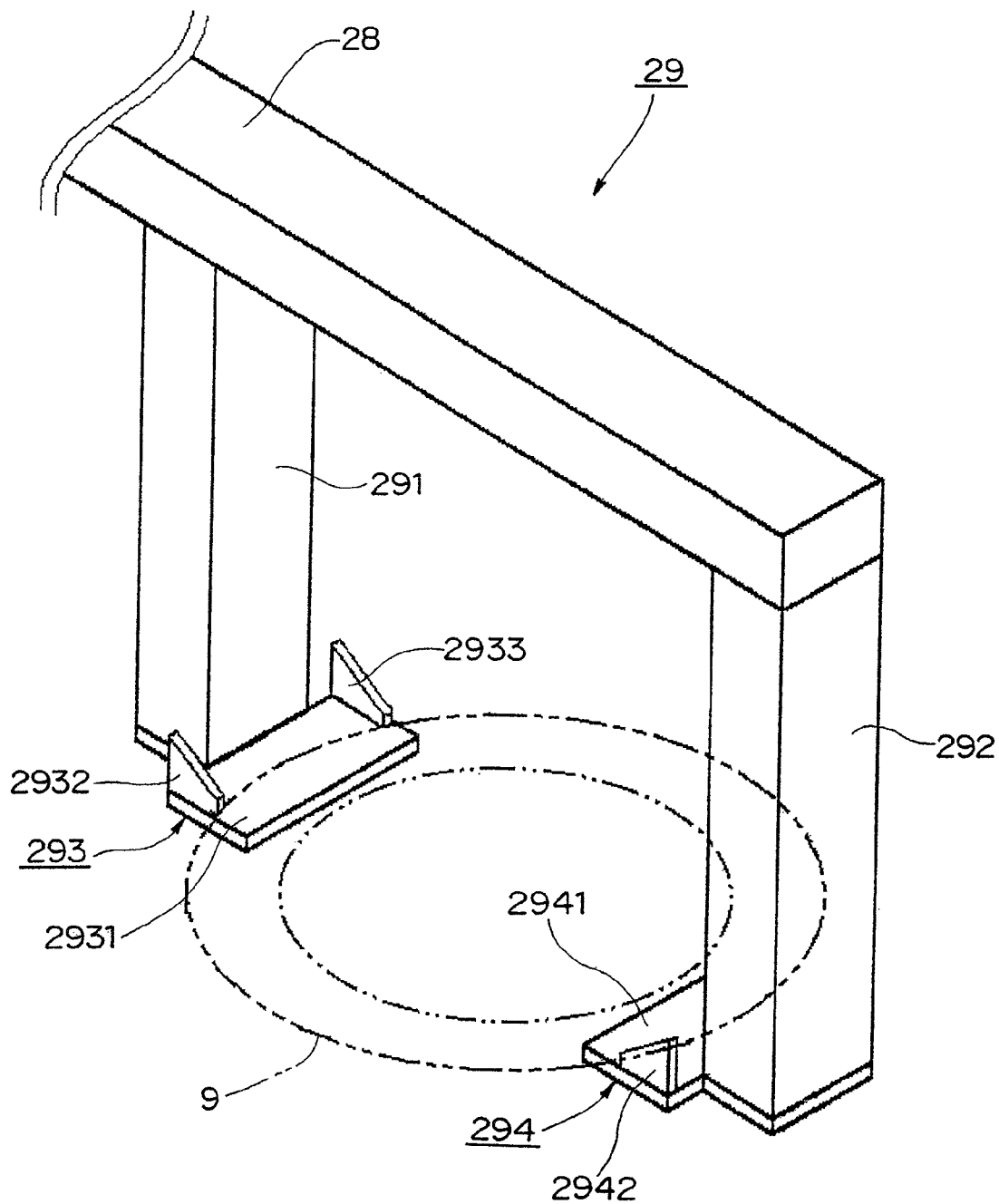
FIG. 8 A perspective view of a holding portion.
Figure 9:
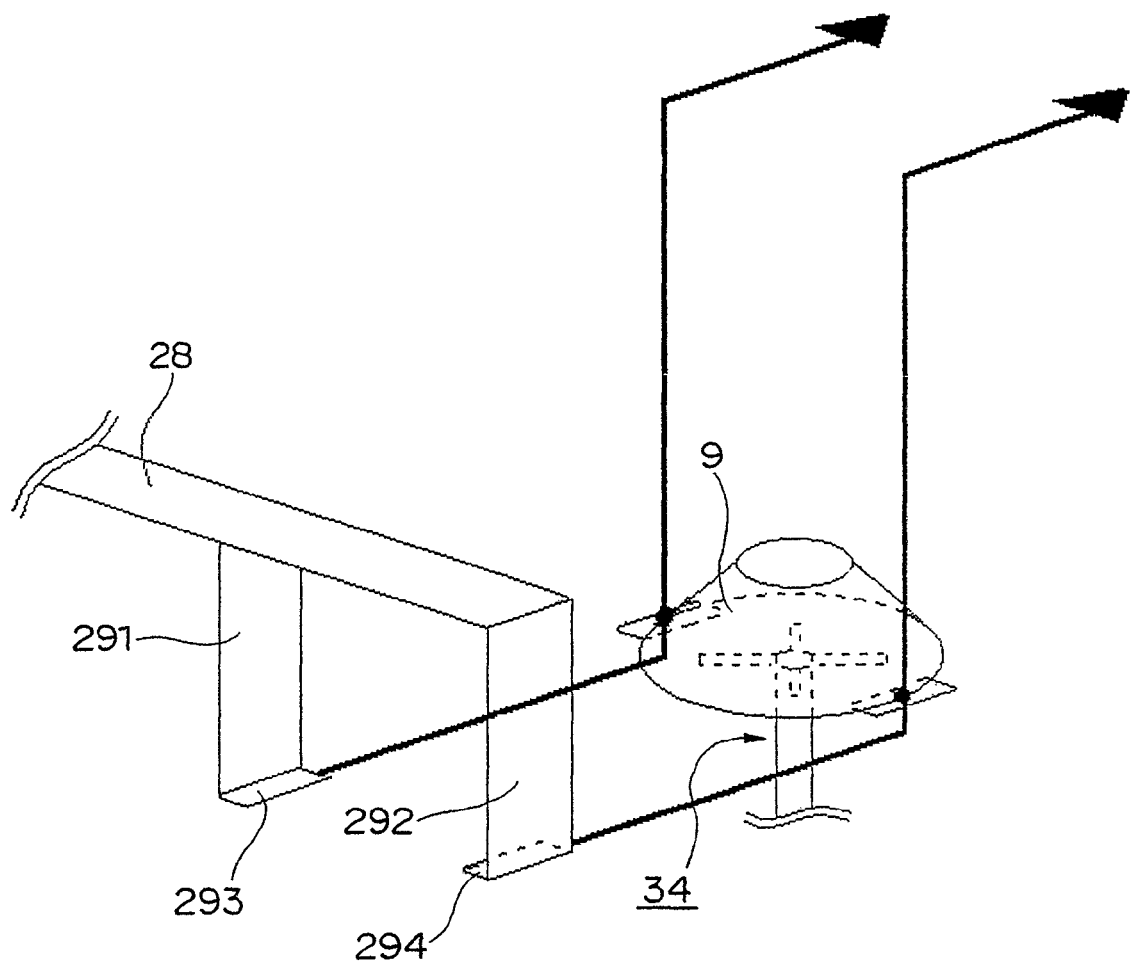
FIG. 9 A perspective view showing a path along which the holding portion is moved.

FIG. 8 is a perspective view of the holding portion 29. The holding portion 29 includes: two arms 291 and 292 drooping down from the front end of the arm 28; and grippers 293 and 294 provided at lower ends of the two arms 291 and 292, respectively. The two arms 291 and 292 are provided at an interval slightly larger than the diameter of the treatment cell 9. The grippers 293 and 294 are provided so as to be opposed to each other at the lower ends of the two arms 291 and 292. The gripper 293 consists of: a horizontal support plate 2931; and guide plates 2932 and 2933 standing at both edges of the support plate 2931. The gripper 294 also consists of: a horizontal support plate 2941; and guide plates 2942 and 2943 standing at both edges of the support plate 2941. As shown in FIG. 9, the holding portion 29 allows the grippers 293 and 294 to make contact with the treatment cell 9 from the bottom of the treatment cell 9 so as to place the treatment cell 9 onto the support plate 2931 and the support plate 2941, and so as to support a peripheral face of the treatment cell 9 by edges of the guide plates 2932 and 2933 and the guide plates 2942 and 2943.

(4) Surface Treatment Apparatus 4

Figure 10:
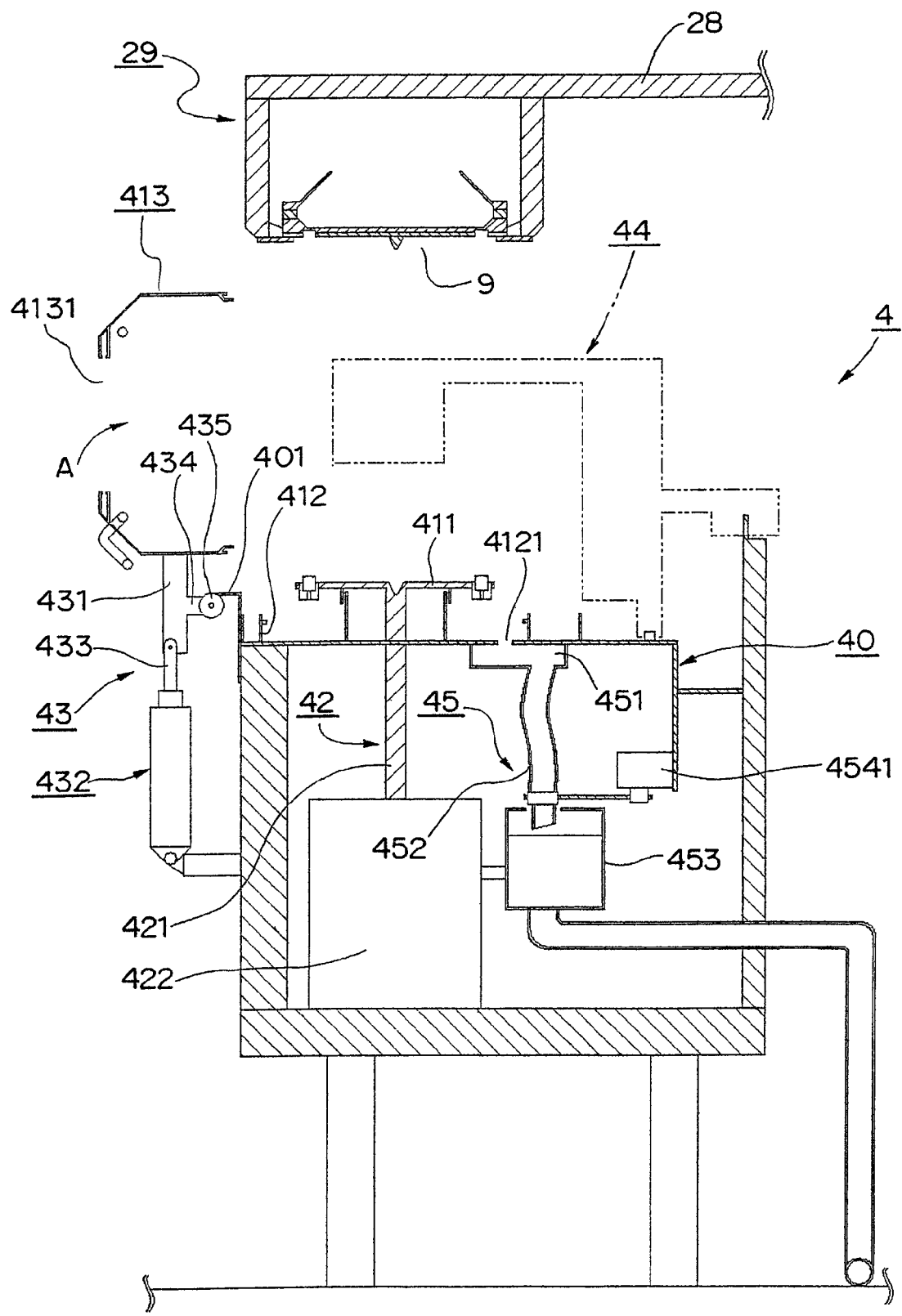
FIG. 10 A longitudinal cross-sectional view of a surface treatment apparatus prior to operation.
Figure 11:
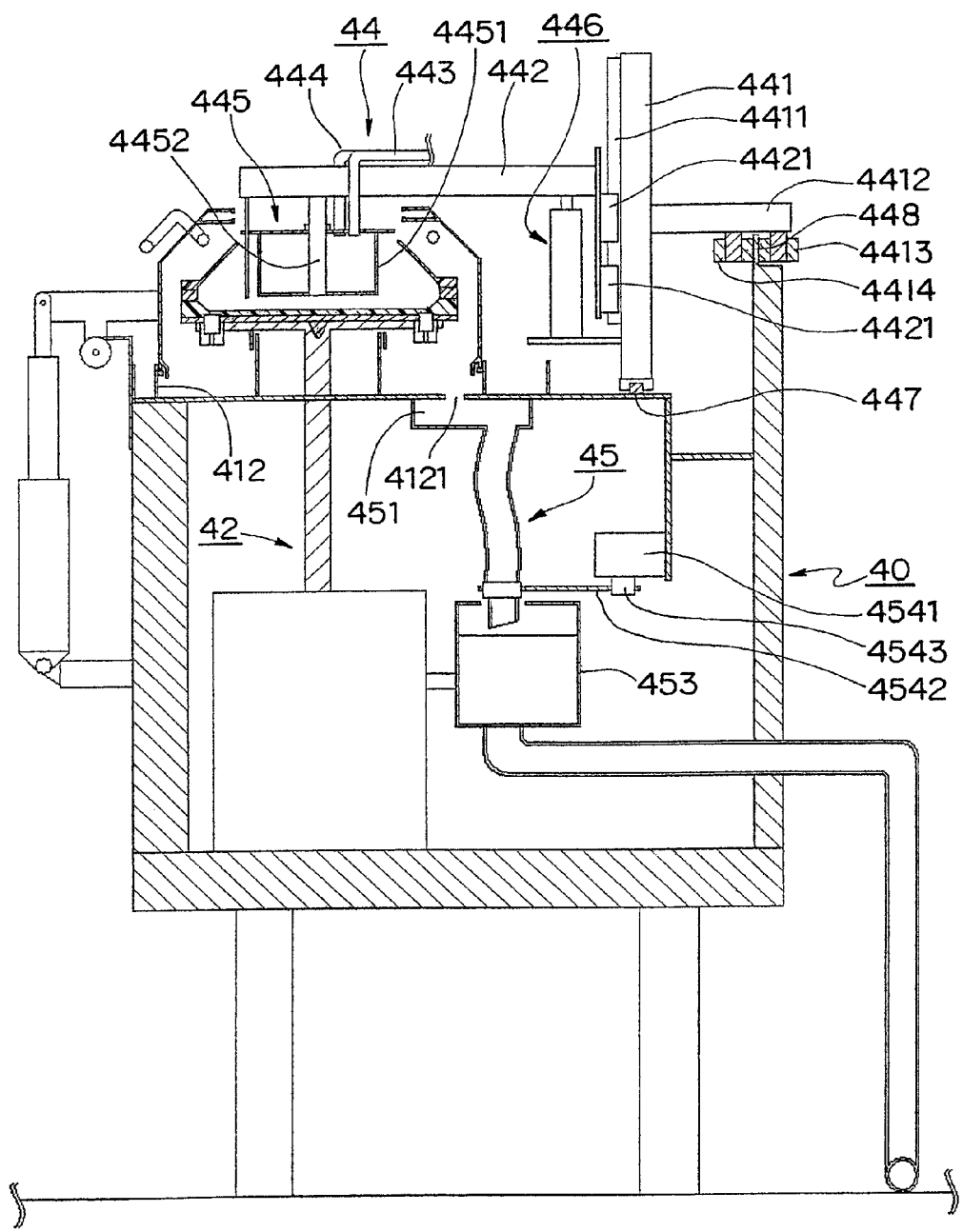
FIG. 11 A longitudinal cross-sectional view of the surface treatment apparatus during operation.

FIG. 10 is a longitudinal cross-sectional view of the surface treatment apparatus 4 prior to operation. The surface treatment apparatus 4 includes: a horizontal receiving plate 411 on which the treatment cell 9 is placed as shown in FIG. 11; a rotation driving means 42 for rotating the receiving plate 411 in a horizontal plane; a receiving vessel 412, located below the receiving plate 411, for receiving a surface treatment liquid and a cleaning water; a cover body 413 for covering the treatment cell 9 on the receiving plate 411 from above; an opening/closing means 43 for opening/closing the cover body 413 with respect to the treatment cell 9 as shown in FIG. 11; a supply means 44 for separately supplying the surface treatment liquid and the cleaning water to the treatment cell 9 on the receiving plate 411; and a drain means 45 communicating with the receiving vessel 412.

Figure 12:
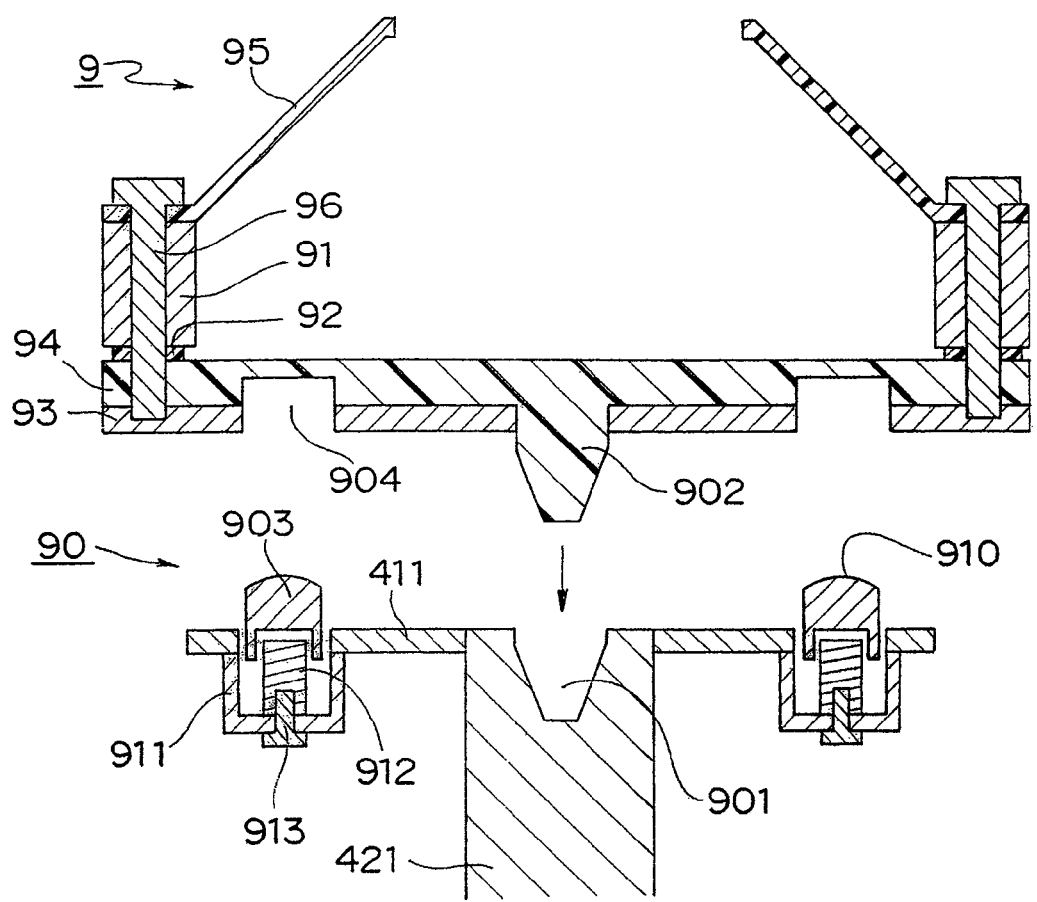
FIG. 12 A longitudinal cross-sectional view showing the state where a treatment cell is not placed onto a receiving plate yet.
Figure 13:
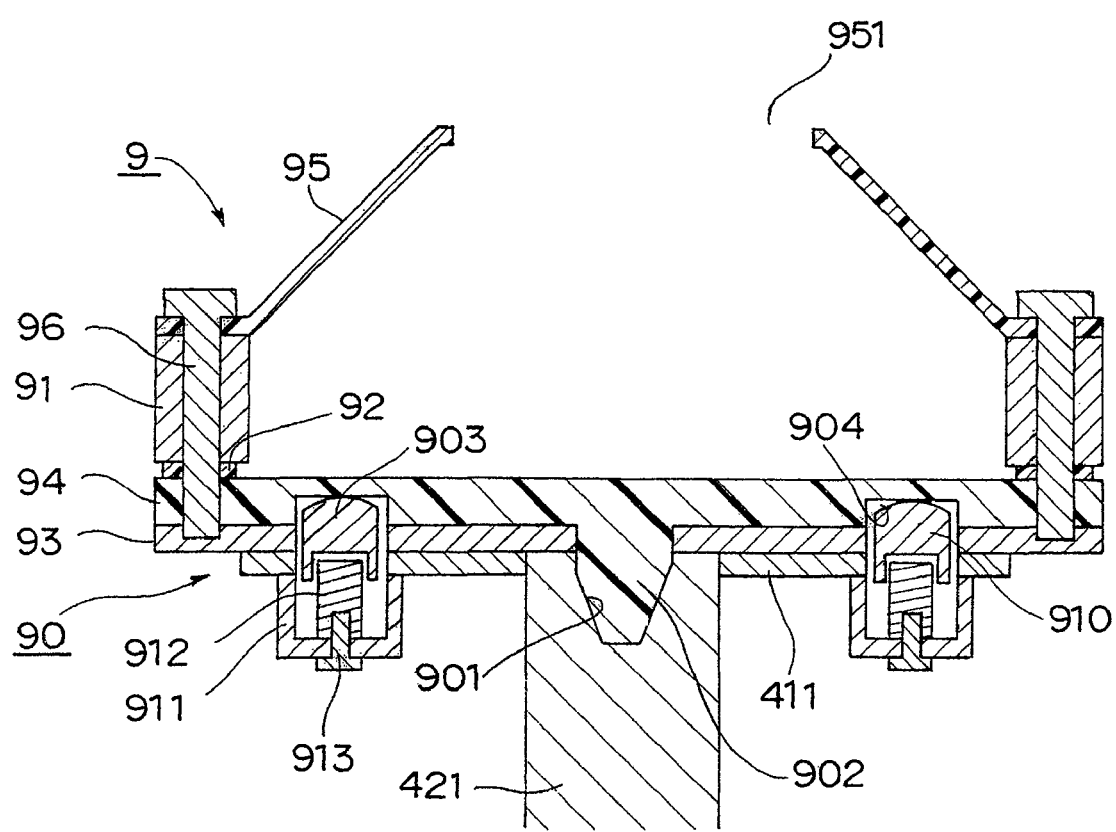
FIG. 13 A longitudinal cross-sectional view showing the state where the treatment cell has been placed onto the receiving plate.

FIGS. 12 and 13 each show a longitudinal cross-sectional view illustrating the relationship between the receiving plate 411 and the treatment cell 9. The treatment cell 9 is formed by a conductive base plate 93, a non-conductive bottom plate 94, an electrode ring 91 and a cover 95, which are superposed in this order from the bottom and are combined with bolts 96 passing through the electrode ring 91, and has a flow-out means for flowing out the surface treatment liquid from the inside of the treatment cell 9 to the outside thereof. The electrode ring 91 can be energized through a vertical rotation shaft 421, the base plate 93 and the bolts 96. In other words, the vertical rotation shaft 421, the base plate 93 and the bolts 96 constitute an energization means for energizing the electrode ring 91. Further, the surface treatment apparatus 4 is formed so as to energize the surface treatment liquid within the treatment cell 9 from an electrode (not shown) while bringing the workpiece into contact with the electrode ring 91 and circulating the surface treatment liquid from the inside of the treatment cell 9 to the outside thereof through the flow-out means by rotating the treatment cell 9 containing the workpiece, thereby performing a surface treatment on the workpiece. As the flow-out means, gap channels formed between the bottom plate 94 and the electrode ring 91 are adopted. Sheet members 92, made of resin and having the same size, are arranged circumferentially at appropriate intervals between the bottom plate 94 and the electrode ring 91, and the sheet members 92 are sandwiched between the bottom plate 94 and the electrode ring 91, thus forming the gap channels between the adjacent sheet members 92.

It should be noted that as the flow-out means of the treatment cell 9, the following structure (a) or (b) may alternatively be adopted.

(a) Grooves communicating with the inside of the treatment cell 9 and the outside thereof are formed at the bottom plate 94, the electrode ring 91 or the cover 95. These grooves serve as the above-mentioned gap channels. The depth of each groove is set to be smaller than the diameter of a workpiece. In such a structure, the treatment cell 9 can be disassembled and cleaned, and the maintenance of the treatment cell 9 can accordingly be simplified.

(b) A ring made of a porous material is sandwiched between the electrode ring 91 and the bottom plate 94, or between the electrode ring 91 and the cover 95. The numerous holes of the ring serve as the above-mentioned gap channels. In such a structure, even if the size of each gap channel is about 10 μm, a surface treatment liquid flows out therethrough, and therefore, a smaller workpiece can be handled. To the contrary, in the case where the above-described sheet members 91 are sandwiched, and in the case of the above-mentioned structure (a), if the size of each gap channel is equal to or less than 30 μm, the outflow of a surface treatment liquid is small, and thus the gap channels do not function as the flow-out means.

The treatment cell 9 is placed onto the receiving plate 411 via an attachment and detachment means 90. The attachment and detachment means 90 is a means for detachably fixing the treatment cell 9 to the vertical rotation shaft 421. The receiving plate 411 is fixed at an upper end of the vertical rotation shaft 421. The attachment and detachment means 90 includes: a concave portion 901 formed at a rotational center of the receiving plate 411; a convex portion 902 provided at a rotational center of a lower face of the base plate 93 of the treatment cell 9; protrusive portions 903 provided at a plurality of positions of the receiving plate 411; and hole portions 904 formed at the base plate 93 and bottom plate 94 of the treatment cell 9. The concave portion 901 has a tapered form. The convex portion 902 is formed so as to be fitted into the concave portion 901. The protrusive portions 903 are each provided so as to be able to be protruded from an upper face of the receiving plate 411. The hole portions 904 are formed so that the protrusive portions 903, protruded from the upper face of the receiving plate 411, are fitted thereto. It should be noted that, at the receiving plate 411, the protrusive portions 903 are preferably located circumferentially at regular intervals, and the number of the protrusive portions 903 is two, four, five, six or eight, for example. The number and location of the hole portions 904 correspond to those of the protrusive portions 903. In this embodiment, the four hole portions 904 are provided.

More specifically, the protrusive portions 903 are provided in the state where they are each urged upward by a spring 912 supported by a pin 913 within a recessed portion 911 provided at the receiving plate 411. An upper end face 910 of each protrusive portion 903 is spherical. Further, in the case where a flat region of the lower face of the base plate 93 faces the recessed portion 911, the protrusive portion 903 is pressed downward by this flat region and pushed inside the recessed portion 911. On the other hand, in the case where the hole portions 904 formed at the base plate 93 and the bottom plate 94 face the recessed portions 911, the protrusive portions 903 are each pressed upward by the spring 912 and fitted into the hole portion 904.

Due to the above-described attachment and detachment means 90, the treatment cell 9 is fixed to the vertical rotation shaft 421 via the receiving plate 411 while the convex portion 902 is fitted into the concave portion 901 of the receiving plate 411 and the protrusive portions 903 of the receiving plate 411 are fitted into the hole portions 904. Furthermore, a rotational force of the vertical rotation shaft 421 is transmitted to the fixed treatment cell 9 via the receiving plate 411. Accordingly, the treatment cell 9 can be rotated together with the vertical rotation shaft 421 while being fixed to the vertical rotation shaft 421 via the receiving plate 411.

The rotation driving means 42 is formed so as to rotate the vertical rotation shaft 421 by a motor 422.

The cover body 413 has, at its center, an opening 4131. The opening/closing means 43 includes: an arm 431 extending from a lateral portion of the cover body 413; and a cylinder means 432 for moving the arm 431. The arm 431 is rotatably connected to a rod 433. The cylinder means 432 moves the rod 433 up and down. The arm 431 is formed at its middle portion with an arm 434 branching orthogonally from the arm 431, and the arm 434 is provided at its front end with a roller 435. The roller 435 is rotatably fixed to a front end portion of a flange 401 of an apparatus main body 40. In the state shown in FIG. 10, upon upward movement of the rod 433, the opening/closing means 43 allows the arm 431 to be rotated around the roller 435 in the direction of the arrow A, and as a result, the state of the cover body 413 is changed from the vertical state shown in FIG. 10 to the horizontal state shown in FIG. 11. In other words, the opening/closing means 43 closes the cover body 413. When the cover body 413 is opened, it is only necessary to move the rod 433 downward contrary to the above description.

As shown in FIG. 11, the supply means 44 includes: a vertical post 441; an arm 442 extending horizontally from the vertical post 441; a surface treatment liquid supply pipe 443; and a cleaning water supply pipe 444. The arm 442 has, at its front end, a head portion 445. The head portion 445 is provided with a case 4451 and an electrode terminal 4452. Further, a supply port of the surface treatment liquid supply pipe 443 and a supply port of the cleaning water supply pipe 444 are located at the head portion 445. A base end portion of the arm 442 is formed so as to be slid, via blocks 4421, on a rail 4411 extending along the vertical post 441. Hence, the arm 442 can be moved up and down along the vertical post 441 by a cylinder means 446. The vertical post 441 is provided so as to be movable on a horizontal rail 447 extending in the depth direction of FIG. 11. It should be noted that a front end of an arm 4412 branching orthogonally from the vertical post 441 is provided with two rollers 4413 and 4414. The two rollers 4413 and 4414 abut against a horizontal rail 448 of the apparatus main body 40 from both sides, thus supporting the vertical post 441 at the apparatus main body 40. The horizontal rail 448 is in parallel with the horizontal rail 447.

Figure 14:
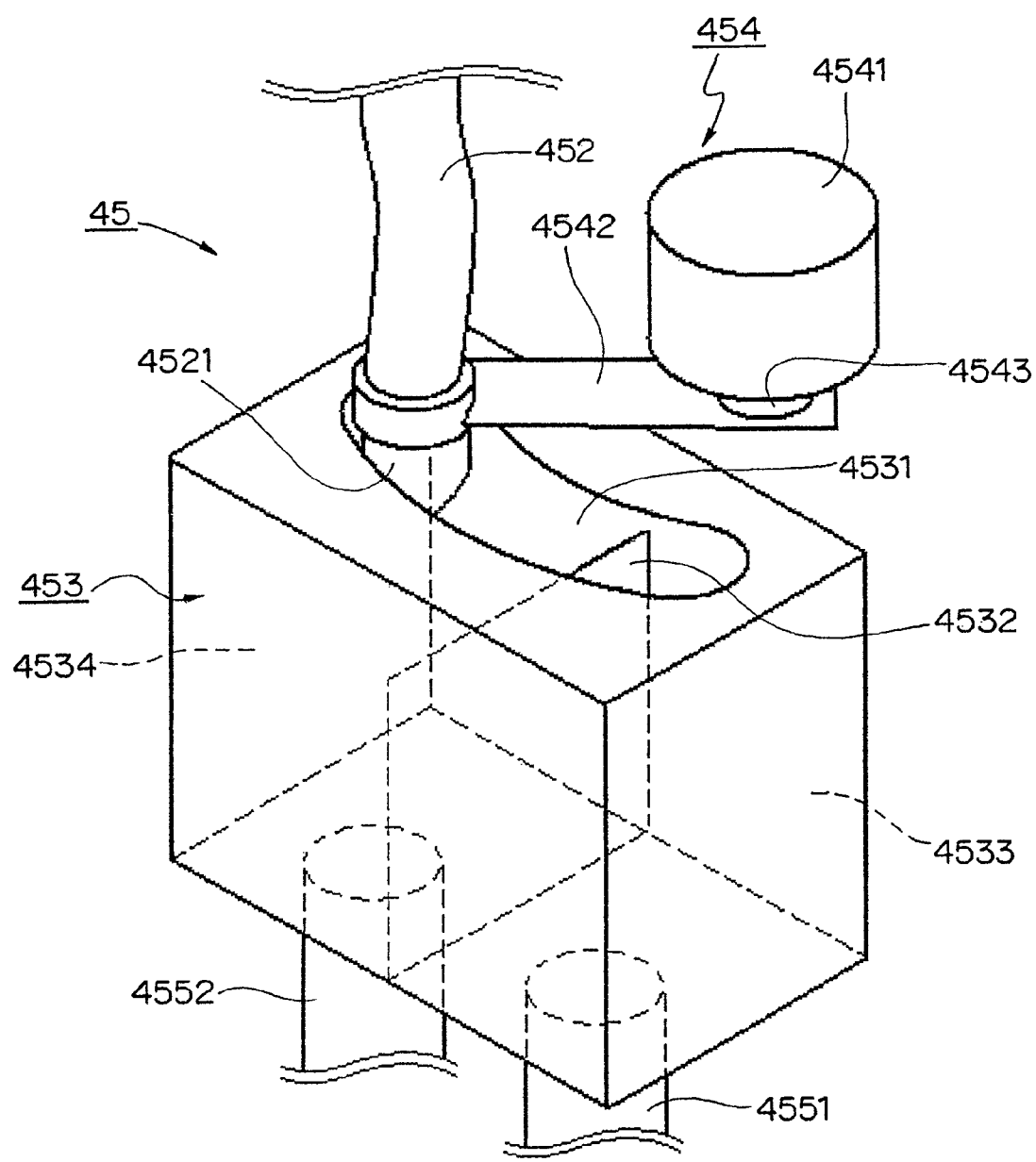
FIG. 14 A perspective view of a drain means.

The drain means 45 is provided so as to be communicated with a discharge port 4121 of the receiving vessel 412. FIG. 14 is a perspective view of the drain means 45. The drain means 45 includes: a receptacle 451 communicating with the discharge port 4121; a flexible hose 452 communicating with the receptacle 451 and extending downward therefrom; a separation vessel 453 into which a front end 4521 of the hose 452 is inserted; and a moving means 454 for moving the front end 4521 of the hose 452 within a predetermined range in a horizontal plane. The separation vessel 453 has, at its upper face, an elongated hole 4531 into which the front end 4521 of the hose 452 is inserted. The inside of the separation vessel 453 is partitioned into two chambers 4533 and 4534 by a partition wall 4532. The moving means 454 includes: a motor 4541 and an arm 4542. The arm 4542 is connected at one end thereof to the front end 4521 of the hose 452, and is connected at the other end thereof to a driving shaft 4543 of the motor 4541. The moving means 454 actuates the motor 4541, thereby allowing the arm 4542 to be rotated around the driving shaft 4543. Thus, the front end 4521 of the hose 452 is moved between both ends of the elongated hole 4531. In the drain means 45, if the front end 4521 of the hose 452 is located at one end of the elongated hole 4531, the front end 4521 is located over one chamber 4533 of the separation vessel 453, and if the front end 4521 of the hose 452 is located at the other end of the elongated hole 4531, the front end 4521 is located over the other chamber 4534 of the separation vessel 453. From bottom faces of the two chambers 4533 and 4534, pipes 4551 and 4552 are extended.

Figure 15:
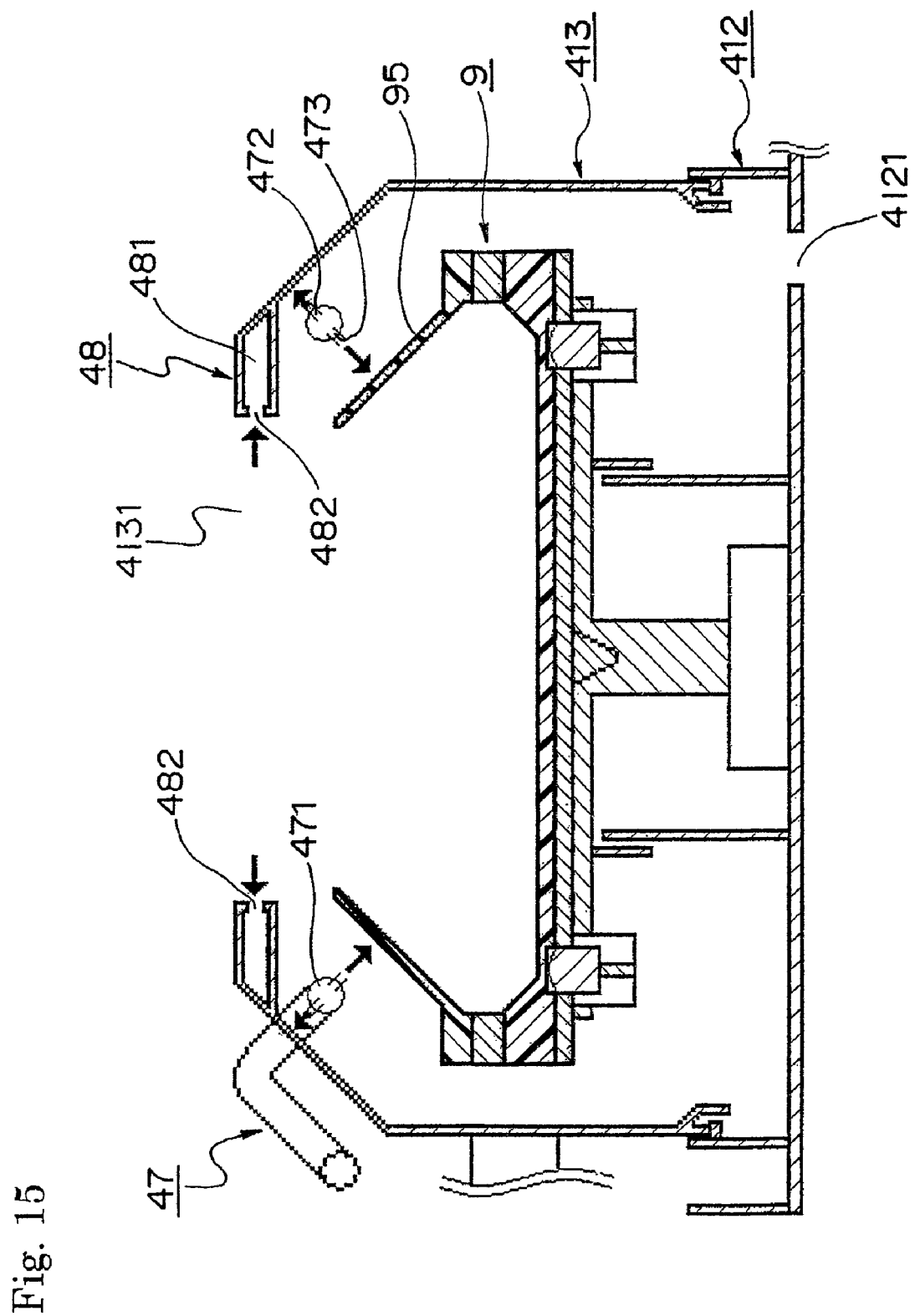
FIG. 15 A longitudinal cross-sectional view of a cover body covering the treatment cell.

As shown in FIG. 15, the cover body 413 includes a cleaning means 47 and a suction means 48. The cleaning means 47 includes a water supply pipe 471 provided annularly at an inner face of the cover body 413. The water supply pipe 471 has: a large number of nozzles 472 facing toward the inner face of the cover body 413; and a large number of nozzles 473 facing toward an outer face of the cover 95 of the treatment cell 9. The suction means 48 includes a suction channel 481 provided along a peripheral edge of the opening 4131 of the cover body 413. The suction channel 481 has a large number of suction ports 482 opened toward the center of the opening 4131.

(5) Workpiece Collection Apparatus 5

Figure 16:
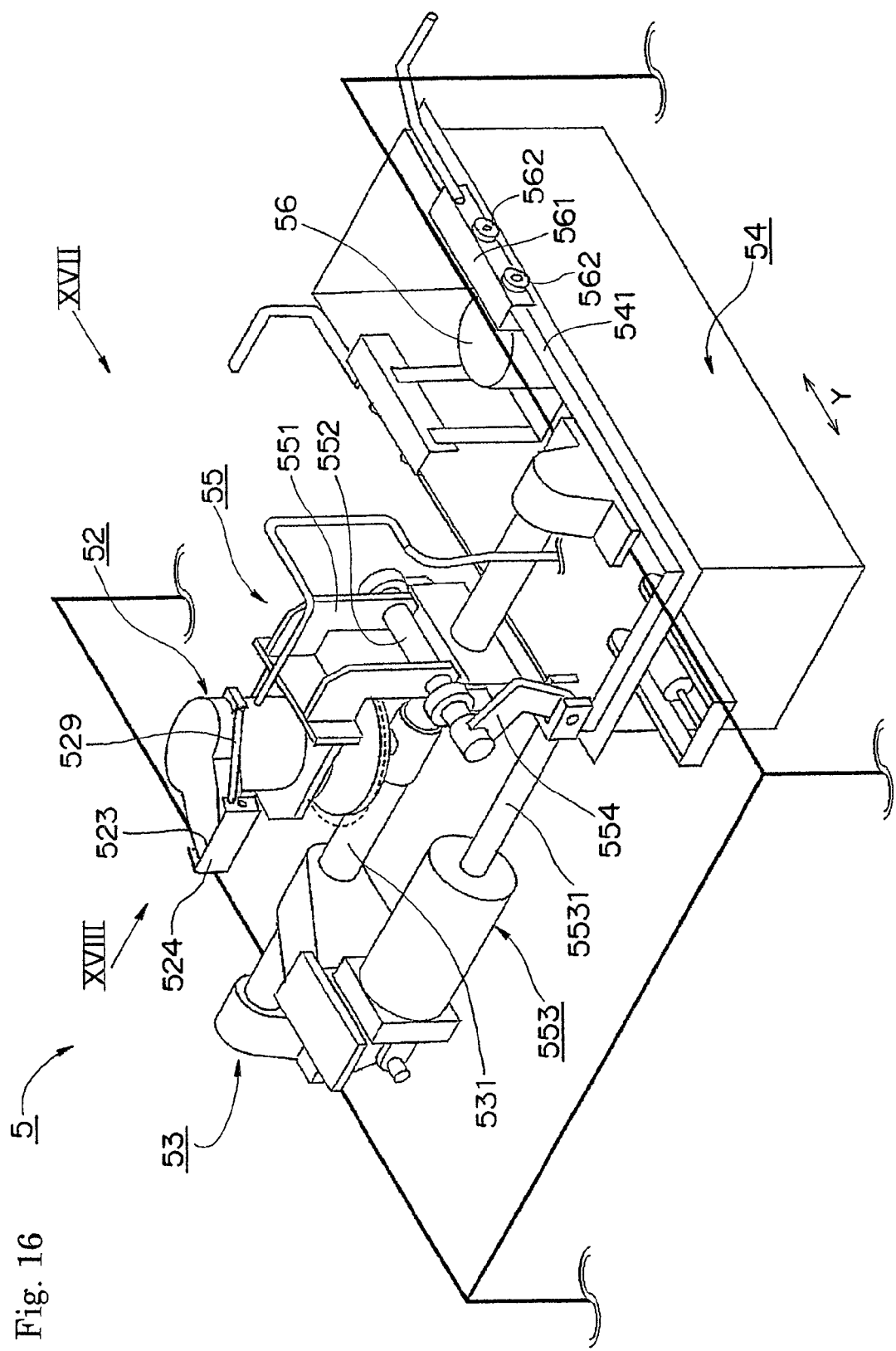
FIG. 16 A perspective view of a workpiece collection apparatus.
Figure 17:
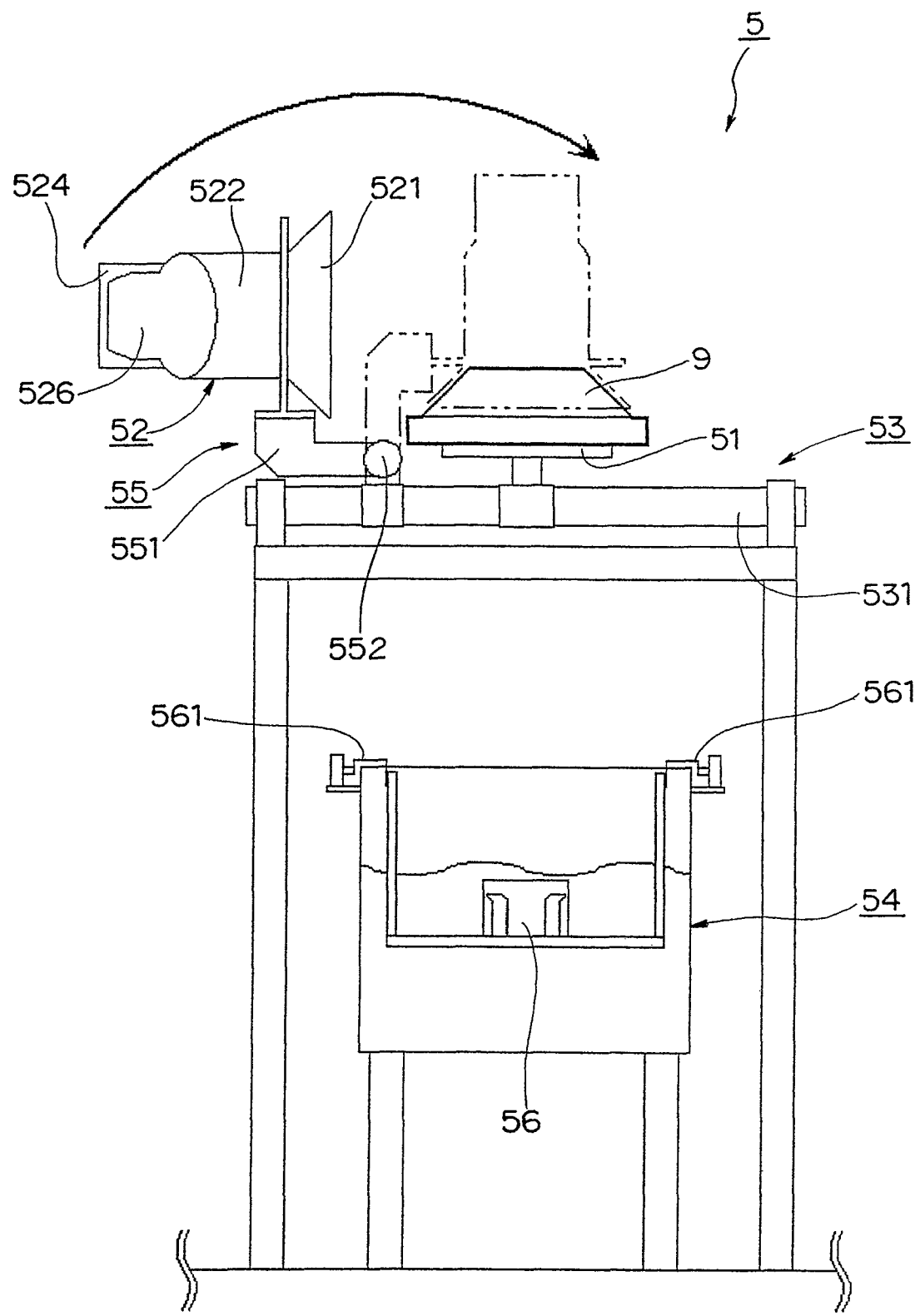
FIG. 17 A diagram viewed from the arrow XVII shown in FIG. 16.
Figure 18:
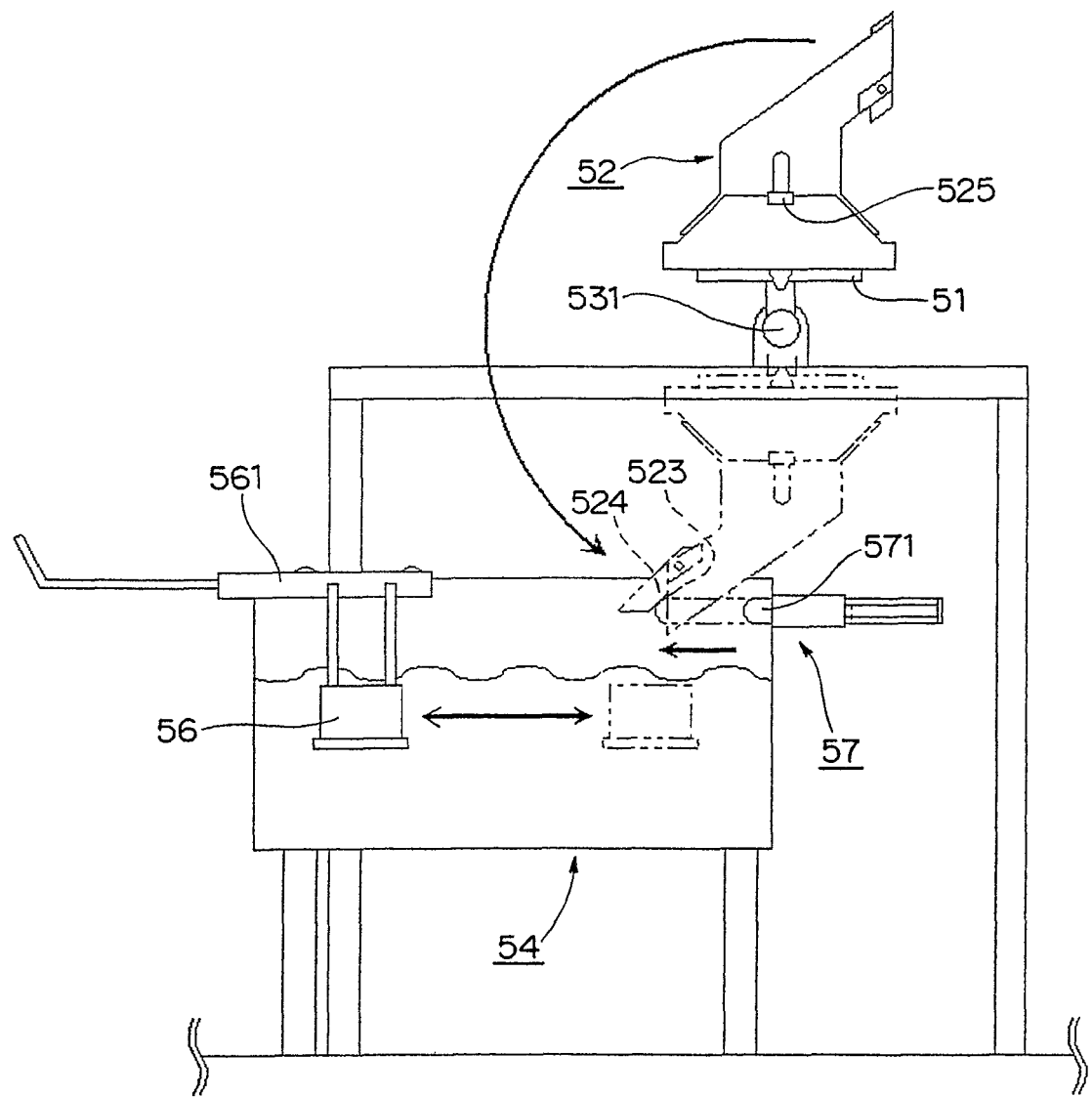
FIG. 18 A diagram viewed from the arrow XVIII shown in FIG. 16.

FIG. 16 is a perspective view of the workpiece collection apparatus 5, FIG. 17 is a diagram viewed from the arrow XVII shown in FIG. 16, and FIG. 18 is a diagram viewed from the arrow XVIII shown in FIG. 16. The workpiece collection apparatus 5 includes: a horizontal receiving plate 51 on which the treatment cell 9 is placed; a hopper 52; an inverting means 53 for inverting both of the treatment cell 9 placed on the receiving plate 51, and the hopper 52; and a collection vessel 54 for collecting a workpiece. It should be noted that since the receiving plate 51 is formed with a concave portion into which the convex portion 902 of the treatment cell 9 is fitted, it is possible to place the treatment cell 9 at the center of the receiving plate 51. Accordingly, the position of the treatment cell 9 with respect to the carrying apparatus 2 can be determined with high precision, and hence the treatment cell 9 can be gripped by the carrying apparatus 2 with certainty.

The hopper 52 has: a spread-out receiving portion 521; a tubular main body portion 522; an inclined discharge portion 526; a discharge port 523; and a sprinkler 525. The discharge port 523 is closed by a lid 524 from outside in an openable and closable manner. The lid 524 is rotated around a shaft provided at the discharge portion 526 so as to be opened and closed. The lid 524 is urged so as to be normally in a closed state by a spring 529 put across the lid 524 and the main body portion 522. Since the lid 524 is urged so as to be normally in a closed state, no workpiece will get out of the hopper 52 until the lid 524 is opened, and accordingly, all workpieces can be collected in the collection vessel 54 with certainty. The sprinkler 525 is provided so as to eject a cleaning water from the main body portion 522 toward the receiving portion 521. The hopper 52 includes a rotation means 55 for allowing the hopper 52 to be rotated by 90 degrees and attached to the treatment cell 9 as indicated by the arrow (shown in FIG. 17). FIG. 17 shows the hopper 52 in a non-attached state, while FIG. 18 shows the hopper 52 in an attached state. In the attached state, the hopper 52 slightly presses, from above, the treatment cell 9 placed on the receiving plate 51. It should be noted that since inner faces of the receiving portion 521, the main body portion 522 and the discharge portion 526 are mirror-polished, it is possible to smoothly slide down all workpieces from the inside of the hopper 52, and accordingly it is possible to collect all the workpieces in the collection vessel 54 with certainty.

The rotation means 55 includes: an L-shaped arm 551; a horizontal rotation shaft 552; and a cylinder means 553 for rotating the rotation shaft 552. The L-shaped arm 551 is laterally connected at one end thereof to the hopper 52, and is fixed at the other end thereof to the rotation shaft 552. The rotation shaft 552 is connected to a front end of a rod 5531 of the cylinder means 553 via an arm 554. The arm 554 is rotatably connected to the rod 5531. In FIG. 17, the rod 5531 is in a retracted state. The rotation means 55 rotates the rotation shaft 552 via the arm 554 by advancing the rod 5531, and accordingly rotates the hopper 52 as indicated by the arrow. It should be noted that upon rotation of the hopper 52, the receiving portion 521 of the hopper 52 is brought into close contact with an opening 951 of the treatment cell 9. Therefore, when the treatment cell 9 and the hopper 52 are inverted, the leakage of workpieces can be prevented, and hence all the workpieces can be collected in the collection vessel 54 with certainty.

The inverting means 53 includes: a rotation shaft 531; and a motor (not shown) for driving the rotation shaft 531. The above-described hopper 52 and rotation means 55, and the receiving plate 51 are fixed to the rotation shaft 531. As indicated by the arrow (shown in FIG. 18), the inverting means 53 inverts the receiving plate 51, the treatment cell 9 and the attached-state hopper 52 by rotating the rotation shaft 531.

The collection vessel 54 has a shape elongated in a direction (i.e., the Y direction) orthogonal to the rotation shaft 531 of the inverting means 53. The collection vessel 54 is provided at its inside with a basket 56 for catching a workpiece. The basket 56 is supported by a cart 561 so as to be movable in the Y direction. The cart 561 is formed so as to be moved on an edge 541 of the collection vessel 54 by rollers 562. The basket 56 is located in the water within the collection vessel 54. Accordingly, it is possible to prevent the collected workpiece from being brought into contact with air, and hence it is possible to prevent a film formed by a surface treatment from being oxidized, thus making it possible to maintain the quality of the workpiece after the surface treatment at a high level. A one-end side of the collection vessel 54 is located below the discharge port 523 of the inverted hopper 52. The one-end side of the collection vessel 54 is provided with a cylinder means 57. As shown in FIG. 18, the cylinder means 57 moves a rod 571 horizontally, so that the lid 524 closing the discharge port 523 of the hopper 52 is opened by a front end of the rod 571 against a force of the spring 529.

(6) Stripping Apparatus 6

The stripping apparatus 6 differs only partially from the surface treatment apparatus 4. Specifically, the stripping apparatus 6 includes a stripping liquid supply pipe 443 instead of the surface treatment liquid supply pipe 443.

(7) Water Rinsing Apparatus 7

Figure 19:
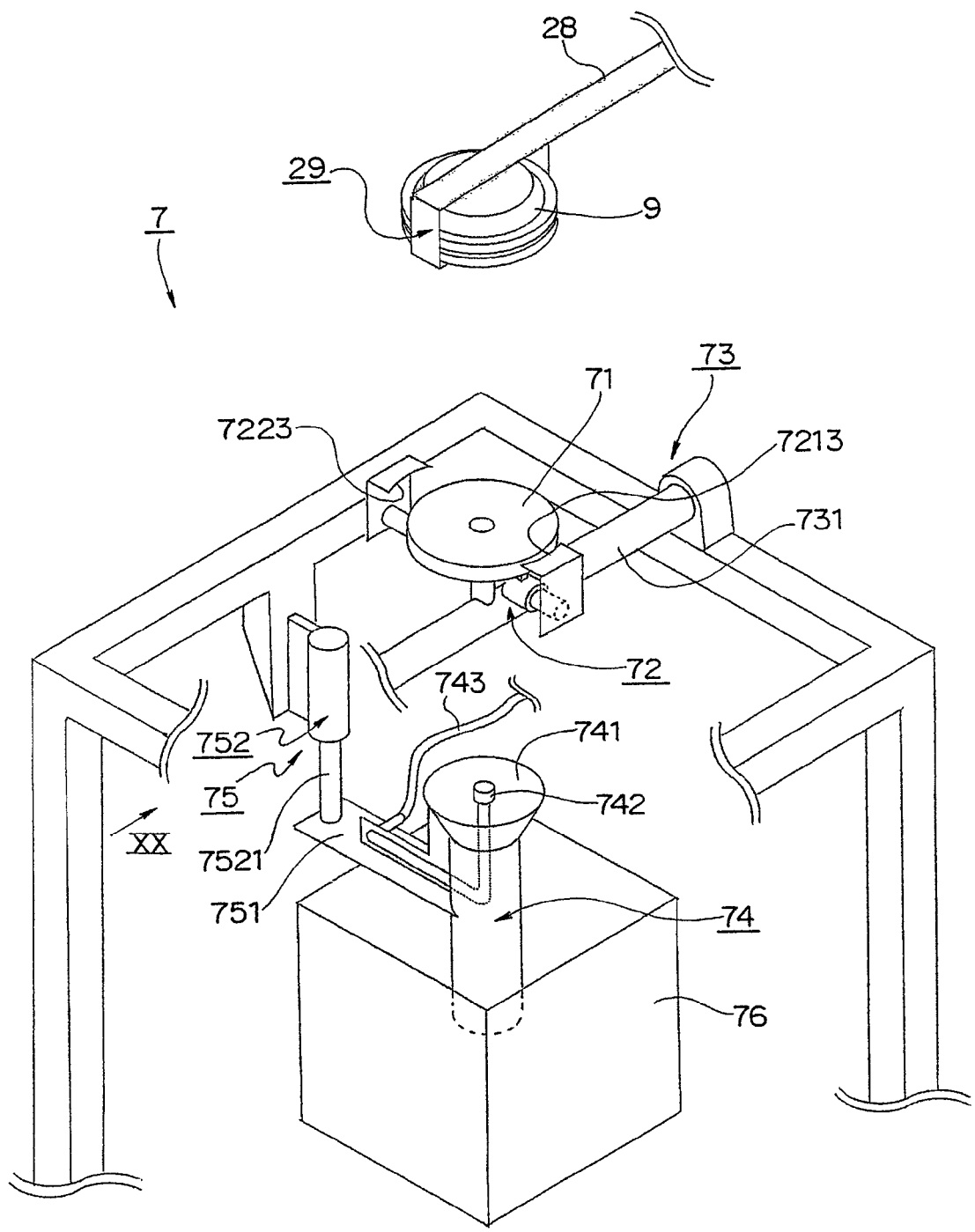
FIG. 19 A perspective view of a water rinsing apparatus.
Figure 20:
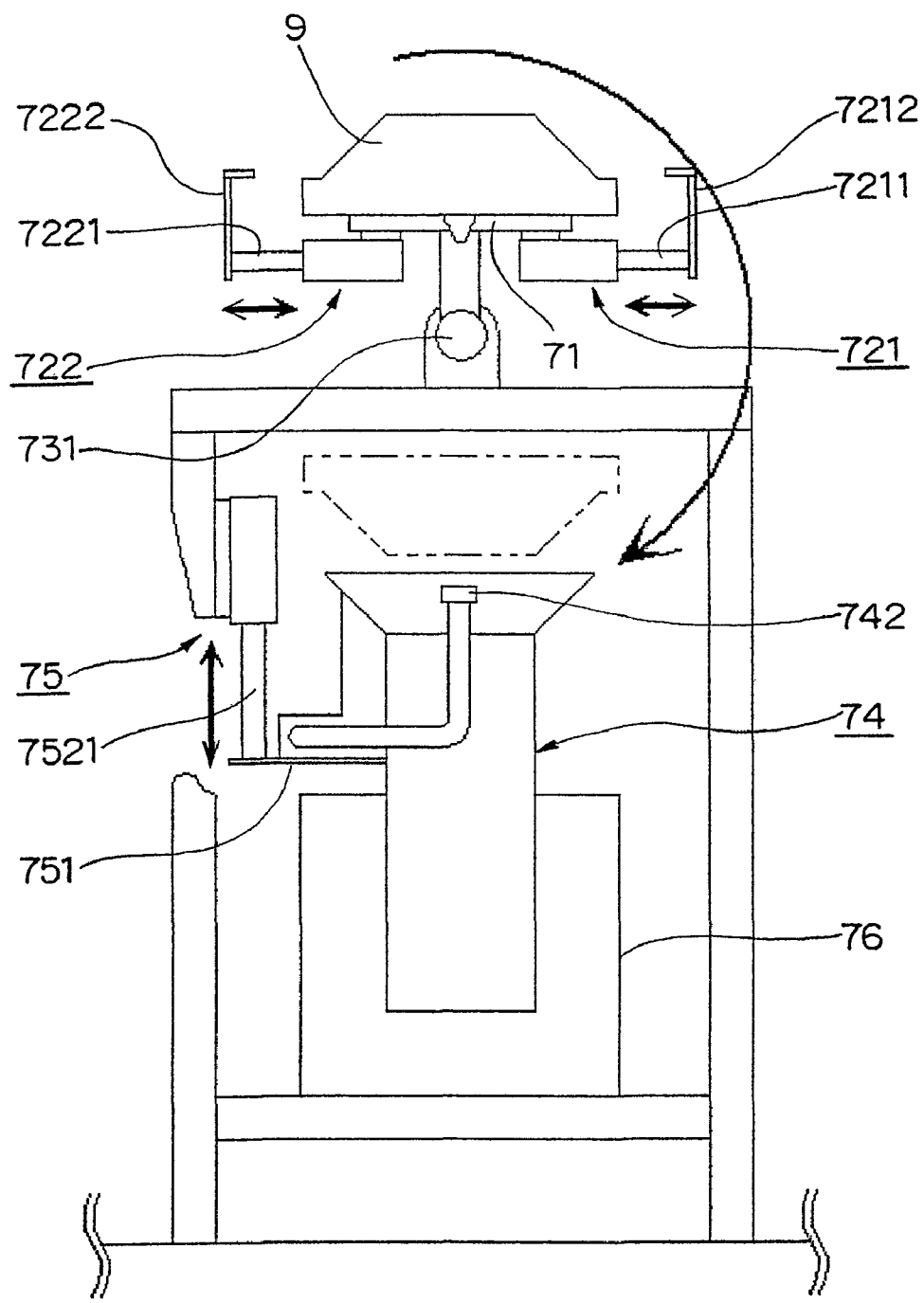
FIG. 20 A diagram viewed from the arrow XX shown in FIG. 19.

FIG. 19 is a perspective view of the water rinsing apparatus 7, and FIG. 20 is a diagram viewed from the arrow XX shown in FIG. 19. The water rinsing apparatus 7 includes: a horizontal receiving plate 71 on which the treatment cell 9 is placed; a fixing means 72 for fixing the treatment cell 9 onto the receiving plate 71; an inverting means 73 for inverting the treatment cell 9 together with the receiving plate 71; and a hopper 74. It should be noted that since the receiving plate 71 is formed with a concave portion into which the convex portion 902 of the treatment cell 9 is fitted, it is possible to place the treatment cell 9 at the center of the receiving plate 71. Accordingly, the position of the treatment cell 9 with respect to the carrying apparatus 2 can be determined with high precision, and hence the treatment cell 9 can be gripped by the carrying apparatus 2 with certainty.

The inverting means 73 includes: a horizontal rotation shaft 731; and a motor (not shown) for rotating the rotation shaft 731.

The receiving plate 71 is fixed to the rotation shaft 731.

The fixing means 72 includes two cylinder means 721 and 722 fixed to a lower face of the receiving plate 71. The cylinder means 721 and 722 are arranged in parallel in a diametrical direction of the receiving plate 71, and are provided so as to outwardly advance and retract rods 7211 and 7221. The rods 7211 and 7221 have, at front ends thereof, gripping plates 7212 and 7222. The fixing means 72 is formed so as to increase/reduce a space between the gripping plates 7212 and 7222 by advancing/retracting the rods 7211 and 7221 of the cylinder means 721 and 722, and so as to sandwich the treatment cell 9 from both sides when the space between the gripping plates 7212 and 7222 is reduced. Front end edges 7213 and 7223 of the gripping plates 7212 and 7222 are each formed into a circular shape. Since the front end edges 7213 and 7223 abut against a portion of the treatment cell 9 having a diameter smaller than its maximum diameter, the gripping plates 7212 and 7222 also serve to press the treatment cell 9 onto the receiving plate 71.

The hopper 74 is communicated with a receiving vessel 76 located therebelow. An inlet 741 of the hopper 74 is opposed, from below, to the opening 951 of the cover 95 of the inverted treatment cell 9. The hopper 74 is provided, at its inside, with a sprinkler 742 for upwardly ejecting a cleaning water. The sprinkler 742 is connected to a cleaning water supply source (not shown) through a flexible hose 743.

The hopper 74 includes a raising and lowering means 75. The raising and lowering means 75 includes an arm 751 and a cylinder means 752. The arm 751 is connected at its one end to the hopper 74, and is connected at its other end to a front end of a rod 7521 of the cylinder means 752. The raising and lowering means 75 moves the rod 7521 up and down, thereby moving the hopper 74 up and down. It should be noted that upon raising of the hopper 74, the inlet 741 of the hopper 74 is brought into close contact with the opening 951 of the treatment cell 9. Accordingly, it is possible to prevent water from being scattered to the periphery of the water rinsing apparatus 7, and hence it is possible to prevent the periphery of the water rinsing apparatus 7 from being contaminated.

(8) Next, operations of the surface treatment system 1 structured as described above will be described.

(A) Carrying-In Step

First, the treatment cell 9 is placed on the four support pieces 313 of the carrying cart 31. Subsequently, a workpiece is put into the treatment cell 9. Then, the carrying cart 31 is moved and is connected to the receiving part 32. Thereafter, a button for starting the operation of the system is pushed. Thus, the receiving part 32 is first actuated.

Upon actuation of the receiving part 32, the placement portion 34 supports, from below, the treatment cell 9 placed on the carrying cart 31, and is raised as indicated by the arrow C shown in FIG. 4. At this time, the treatment cell 9 is guided to the center of the vertical arm 342 because the convex portion 902 is fitted into the concave portion of the upper end of the vertical arm 342. Then, the placement portion 34 is stopped at a height similar to that of the holding portion 29 of the carrying apparatus 2.

(B) Carrying Step [1]

Next, the actuation of the carrying apparatus 2 is started. First, the holding portion 29 grips the treatment cell 9 placed on the placement portion 34. Then, as indicated by the path [1-1] in FIG. 2, the actuation part 21 is moved horizontally along the rail part 22.

Subsequently, as indicated by the path [1-2] in FIG. 2, the gripping portion 26 of the actuation part 21 is lowered to place the treatment cell 9 on the receiving plate 411 of the surface treatment apparatus 4, and is then lowered to a position lower than that of the treatment cell 9 and stopped. This stopped position is at a height that does not cause the guide plates 2932, 2933, 2942 and 2943 to collide against the treatment cell 9 during the horizontal movement of the grippers 293 and 294 of the gripping portion 26. Thereafter, as indicated by the path [1-3] in FIG. 2, the actuation part 21 is moved slightly horizontally along the rail part 22, thus placing the gripping portion 26 at a standby position.

(C) Surface Treatment Step (C-1) Cover Body Closing Step

When the gripping portion 26 has been placed at the standby position, the actuation of the surface treatment apparatus 4 is started. First, the opening/closing means 43 is actuated, thereby closing the cover body 413. In other words, the cover body 413 covers the treatment cell 9 placed on the receiving plate 411.

(C-2) Drain Actuation Step [1]

Next, the drain means 45 is actuated, thereby allowing the front end 4521 of the hose 452 to be positioned over the chamber 4534 of the separation vessel 453, which collects a cleaning water.

(C-3) Cleaning Step [1]

Next, in the supply means 44, after the horizontal movement of the vertical post 441, the arm 442 is lowered, and the head portion 445 is positioned within the opening 951 of the treatment cell 9 placed on the receiving plate 411.

Subsequently, a cleaning water is injected into the treatment cell 9 from the cleaning water supply pipe 444 of the supply means 44, and the rotation driving means 42 is actuated to rotate the treatment cell 9. Thus, the inside of the treatment cell 9 is cleaned. After a certain period of time has passed, the supply of the cleaning water is stopped, but the rotation of the treatment cell 9 is continued. Thus, a dehydration process is carried out.

Next, the cleaning means 47 of the cover body 413 is actuated. Thus, the inner face of the cover body 413 and the outer face of the cover 95 of the treatment cell 9 are cleaned. After a certain period of time has passed, the cleaning means 47 is stopped, and the rotation of the treatment cell 9 is also stopped.

(C-4) Drain Actuation Step [2]

Next, the drain means 45 is actuated, thereby allowing the front end 4521 of the hose 452 to be positioned over the chamber 4533 of the separation vessel 453, which collects a surface treatment water.

(C-5) Treatment Step

Next, a surface treatment liquid is injected into the treatment cell 9 from the surface treatment liquid supply pipe 443 of the supply means 44, and the rotation driving means 42 is actuated to rotate the treatment cell 9. In addition, the suction means 48 of the cover body 413 is actuated, thereby sucking air from the suction ports 482. At this time, since mist containing a component of the surface treatment liquid is sucked in from the suction ports 482, the air in the periphery of the surface treatment apparatus 4 can be prevented from being contaminated. Further, if the surface treatment is performed by an electrolytic process, the electrode ring 91 of the treatment cell 9 is energized. Then, the injection of the surface treatment liquid is stopped after a certain period of time has passed, and then the rotation of the treatment cell 9 is stopped after a certain period of time has further passed. Thus, a drainage process is carried out.

(C-6) Drain Actuation Step [3]

Next, the drain means 45 is actuated, thereby allowing the front end 4521 of the hose 452 to be positioned over the chamber 4534 of the separation vessel 453, which collects a cleaning water.

(C-7) Cleaning Step [2]

Subsequently, a cleaning water is injected into the treatment cell 9 from the cleaning water supply pipe 444 of the supply means 44, and the rotation driving means 42 is actuated to rotate the treatment cell 9. Thus, the inside of the treatment cell 9 is cleaned. After a certain period of time has passed, the supply of the cleaning water is stopped, but the rotation of the treatment cell 9 is continued. Thus, a dehydration process is carried out.

Next, the cleaning means 47 of the cover body 413 is actuated. Thus, the inner face of the cover body 413 and the outer face of the cover 95 of the treatment cell 9 are cleaned. After a certain period of time has passed, the cleaning means 47 is stopped, and the rotation of the treatment cell 9 is also stopped.

Then, the suction means 48 is also stopped.

(C-8) Cover Body Opening Step

Then, the opening/closing means 43 is actuated, thereby opening the cover body 413.

(D) Carrying Step [2]

Next, the carrying apparatus 2 is actuated. First, as indicated by the path [2-1] in FIG. 2, the actuation part 21 is moved slightly horizontally along the rail part 22. In other words, the gripping portion 26 is moved from the standby position to the position of the treatment cell 9 placed on the receiving plate 411. Then, the gripping portion 26 holds the treatment cell 9.

Subsequently, as indicated by the path [2-2] in FIG. 2, the gripping portion 26 of the actuation part 21 is raised. Next, as indicated by the path [2-3] in FIG. 2, the actuation part 21 is moved horizontally along the rail part 22, and is stopped at the position of the workpiece collection apparatus 5.

Subsequently, as indicated by the path [2-4] in FIG. 2, the gripping portion 26 of the actuation part 21 is lowered to place the treatment cell 9 on the receiving plate 51 of the workpiece collection apparatus 5, and is then lowered to a position lower than that of the treatment cell 9 and stopped. This stopped position is at a height that does not cause the guide plates 2932, 2933, 2942 and 2943 to collide against the treatment cell 9 during the horizontal movement of the grippers 293 and 294 of the gripping portion 26. At this time, the treatment cell 9 is guided to the center of the receiving plate 51 because the convex portion 902 is fitted into the concave portion of the receiving plate 51. Thereafter, as indicated by the path [2-5] in FIG. 2, the actuation part 21 is moved slightly horizontally along the rail part 22, thus placing the gripping portion 26 at a standby position.

(E) Workpiece Collection Step

If a sensor (not shown) has detected that the treatment cell 9 is placed on the receiving plate 51 and the basket 56 is located at a predetermined collection position, the rotation means 55 is actuated, thereby attaching the hopper 52 to the treatment cell 9, and sounding a chime.

Next, the inverting means 53 is actuated, thereby inverting the treatment cell 9 and the hopper 52.

Subsequently, water is ejected from the sprinkler 525, and immediately after this, the cylinder means 57 is actuated, thereby opening the lid 524. At this time, since water is ejected from the sprinkler 525, the entire inner face of the treatment cell 9 can be squirted with water, and accordingly, a workpiece inside the treatment cell 9 can be flowed down with certainty. Thus, the workpiece inside the treatment cell 9 is flowed out of the treatment cell 9 and discharged from the discharge port 523 of the hopper 52 together with water. The discharged workpieces are accumulated in the basket 56.

After a certain period of time has passed, the sprinkler 525 is stopped, and thereafter the cylinder means 57 is actuated, thereby closing the lid 524.

Next, the inverting means 53 is actuated, so that the treatment cell 9 and the hopper 52 are inverted again, and are reinstated. Then, the rotation means 55 is actuated, thereby bringing the hopper 52 to the non-attached state, and sounding a chime.

It should be noted that the basket 56 is moved frontward by the cart 561, and the basket 56 is taken out to collect the workpiece.

(F) Carrying Step [3]

Next, the carrying apparatus 2 is actuated. First, as indicated by the path [3-1] in FIG. 2, the actuation part 21 is moved slightly horizontally along the rail part 22. In other words, the gripping portion 26 is moved from the standby position to the position of the treatment cell 9 placed on the receiving plate 51. Then, the gripping portion 26 holds the treatment cell 9.

Subsequently, as indicated by the path [3-2] in FIG. 2, the gripping portion 26 of the actuation part 21 is raised. Next, as indicated by the path [3-3] in FIG. 2, the actuation part 21 is moved horizontally along the rail part 22, and is stopped at the position of the stripping apparatus 6.

Subsequently, as indicated by the path [3-4] in FIG. 2, the gripping portion 26 of the actuation part 21 is lowered to place the treatment cell 9 on the receiving plate 411 of the stripping apparatus 6, and is then lowered to a position lower than that of the treatment cell 9 and stopped. This stopped position is at a height that does not cause the guide plates 2932, 2933, 2942 and 2943 to collide against the treatment cell 9 during the horizontal movement of the grippers 293 and 294 of the gripping portion 26. Thereafter, as indicated by the path [3-5] in FIG. 2, the actuation part 21 is moved slightly horizontally along the rail part 22, thus placing the gripping portion 26 at a standby position.

(G) Stripping Process Step (G-1) Cover Body Closing Step

When the gripping portion 26 has been placed at the standby position, the actuation of the stripping apparatus 6 is started. First, the opening/closing means 43 is actuated, thereby closing the cover body 413. In other words, the cover body 413 covers the treatment cell 9 placed on the receiving plate 411.

(G-2) Drain Actuation Step [1]

Next, the drain means 45 is actuated, thereby allowing the front end 4521 of the hose 452 to be positioned over the chamber (not shown) of the separation vessel 453, which collects a stripping liquid.

(G-3) Process Step

Next, in the supply means 44, after the horizontal movement of the vertical post 441, the arm 442 is lowered, and the head portion 445 is positioned within the opening 951 of the treatment cell 9 placed on the receiving plate 411.

Subsequently, a stripping liquid is injected into the treatment cell 9 from the stripping liquid supply pipe 443 of the supply means 44, and the rotation driving means 42 is actuated to rotate the treatment cell 9. In addition, the suction means 48 of the cover body 413 is actuated, thereby sucking air from the suction ports 482. Thus, attachments (including a plating film, for example) to the inner face of the treatment cell 9 are stripped off. After a certain period of time has passed, the supply of the stripping liquid is stopped, but the rotation of the treatment cell 9 is continued. Thus, a drainage process is carried out. Then, the rotation of the treatment cell 9 is stopped.

(G-4) Drain Actuation Step [2]

Next, the drain means 45 is actuated, thereby allowing the front end 4521 of the hose 452 to be positioned over the chamber 4534 of the separation vessel 453, which collects a cleaning water.

(G-5) Cleaning Step

Subsequently, a cleaning water is injected into the treatment cell 9 from the cleaning water supply pipe 444 of the supply means 44, and the rotation driving means 42 is actuated to rotate the treatment cell 9. Thus, the inside of the treatment cell 9 is cleaned. After a certain period of time has passed, the supply of the cleaning water is stopped, but the rotation of the treatment cell 9 is continued. Thus, a dehydration process is carried out.

Next, the cleaning means 47 of the cover body 413 is actuated. Thus, the inner face of the cover body 413 and the outer face of the cover 95 of the treatment cell 9 are cleaned. After a certain period of time has passed, the cleaning means 47 is stopped, and the rotation of the treatment cell 9 is also stopped.

Then, the suction means 48 is also stopped.

(G-6) Cover Body Opening Step

Then, the opening/closing means 43 is actuated, thereby opening the cover body 413.

(H) Carrying Step [4]

Next, the carrying apparatus 2 is actuated. First, as indicated by the path [4-1] in FIG. 2, the actuation part 21 is moved slightly horizontally along the rail part 22. In other words, the gripping portion 26 is moved from the standby position to the position of the treatment cell 9 placed on the receiving plate 411. Then, the gripping portion 26 holds the treatment cell 9.

Subsequently, as indicated by the path [4-2] in FIG. 2, the gripping portion 26 of the actuation part 21 is raised. Next, as indicated by the path [4-3] in FIG. 2, the actuation part 21 is moved horizontally along the rail part 22, and is stopped at the position of the water rinsing apparatus 7.

Subsequently, as indicated by the path [4-4] in FIG. 2, the gripping portion 26 of the actuation part 21 is lowered to place the treatment cell 9 on the receiving plate 71 of the water rinsing apparatus 7, and is then lowered to a position lower than that of the treatment cell 9 and stopped. This stopped position is at a height that does not cause the guide plates 2932, 2933, 2942 and 2943 to collide against the treatment cell 9 during the horizontal movement of the grippers 293 and 294 of the gripping portion 26. At this time, the treatment cell 9 is guided to the center of the receiving plate 71 because the convex portion 902 is fitted into the concave portion of the receiving plate 71. Thereafter, as indicated by the path [4-5] in FIG. 2, the actuation part 21 is moved slightly horizontally along the rail part 22, thus placing the gripping portion 26 at a standby position.

(I) Water Rinsing Step

When the gripping portion 26 has been placed at the standby position, the actuation of the water rinsing apparatus 7 is started. First, the fixing means 72 is actuated, thereby fixing the treatment cell 9 onto the receiving plate 71.

Next, the inverting means 73 is actuated, thereby inverting the treatment cell 9 together with the receiving plate 71.

Subsequently, the raising and lowering means 75 is actuated, thereby raising the hopper 74 to be in the immediate vicinity of the treatment cell 9.

Thereafter, water is ejected from the sprinkler 742. Thus, the entire inner face of the treatment cell 9 is squirted with water, so that all of the stripping liquid and attachments remaining inside the treatment cell 9 are flowed out of the treatment cell 9 with certainty, and are collected into the receiving vessel 76 through the hopper 74.

After a certain period of time has passed, the sprinkler 742 is stopped.

Next, the raising and lowering means 75 is actuated, thereby lowering the hopper 74.

Subsequently, the inverting means 73 is actuated, so that the receiving plate 71 and the treatment cell 9 are both inverted again, and are reinstated.

Then, the fixing means 72 is actuated, thereby releasing the fixation of the treatment cell 9.

(J) Carrying Step [5]

Next, the carrying apparatus 2 is actuated. First, as indicated by the path [5-1] in FIG. 2, the actuation part 21 is moved slightly horizontally along the rail part 22. In other words, the gripping portion 26 is moved from the standby position to the position of the treatment cell 9 placed on the receiving plate 71. Then, the gripping portion 26 holds the treatment cell 9.

Subsequently, as indicated by the path [5-2] in FIG. 2, the gripping portion 26 of the actuation part 21 is raised. Next, as indicated by the path [5-3] in FIG. 2, the actuation part 21 is moved horizontally along the rail part 22, and is stopped at the position of the receiving part 32.

(K) Carrying-Out Step

Then, the receiving part 32 is actuated. First, the placement portion 34 is raised so as to support, from below, the treatment cell 9 held by the holding portion 29 of the carrying apparatus 2.

Next, the actuation part 21 of the carrying apparatus 2 is moved slightly horizontally, thereby retreating the holding portion 29 from the placement portion 34.

Subsequently, the placement portion 34 is lowered with the treatment cell 9 placed thereon. At some point in this, the treatment cell 9 is placed on the four support pieces 313 of the carrying cart 31.

Then, the carrying cart 31 is moved away from the receiving part 32 to take out the treatment cell 9 from the carrying cart 31, and a new treatment cell 9 is placed on the carrying cart 31.

Then, operations similar to the ones described above are carried out.

Due to the above-described operations, the surface treatment system structured as mentioned above can carry the treatment cell 9 containing a workpiece to the surface treatment apparatus 4, the workpiece collection apparatus 5, the stripping apparatus 6 and the water rinsing apparatus 7 automatically in this order; therefore, the surface-treated workpiece can be obtained with a high operating efficiency, and furthermore, the cleaned treatment cell 9 can also be obtained.

Other Embodiments

In the present invention, the following modified structures may alternatively be adopted.

Figure 21:
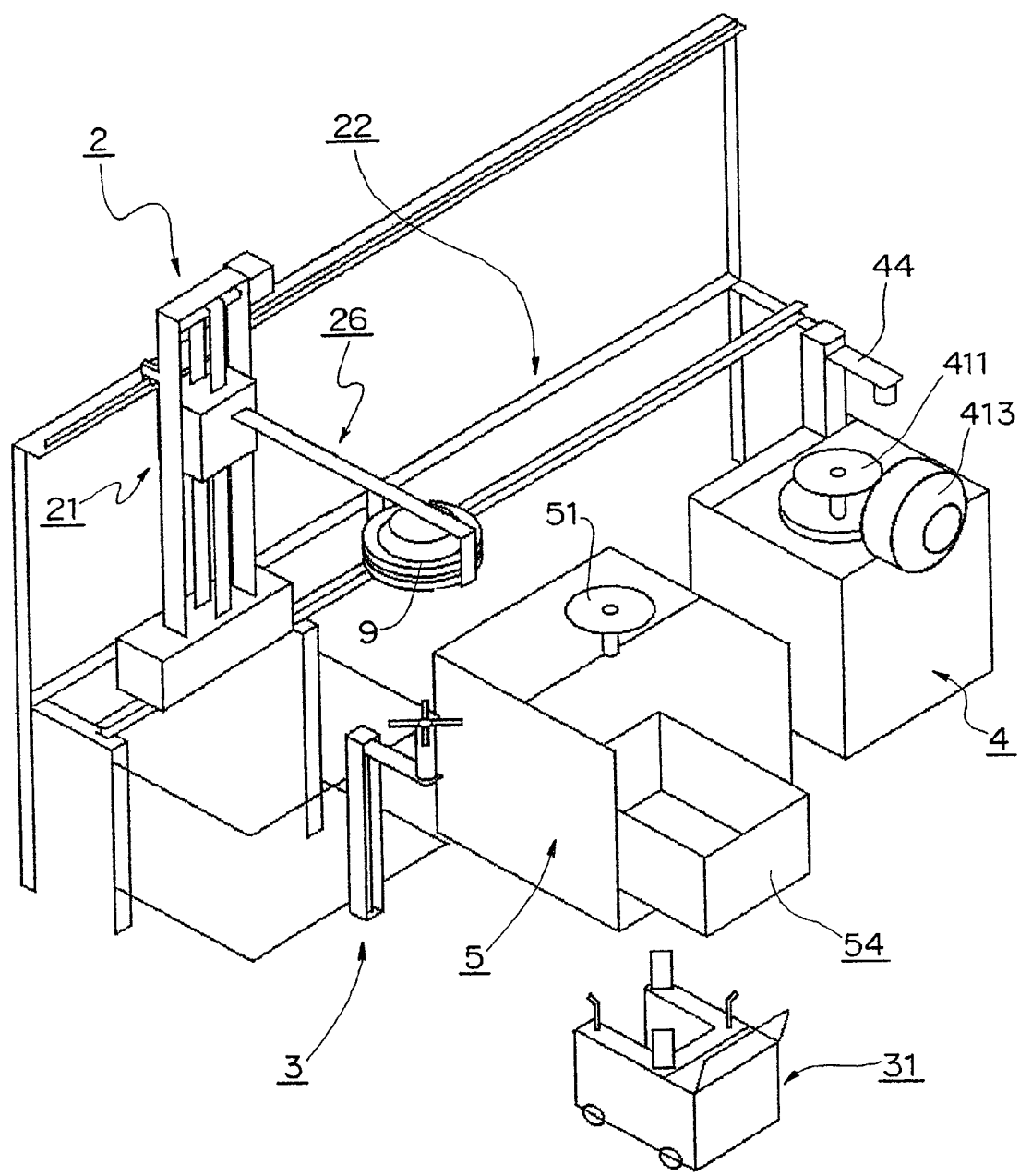
FIG. 21 A perspective view of a surface treatment system according to a first modified example.
Figure 22:
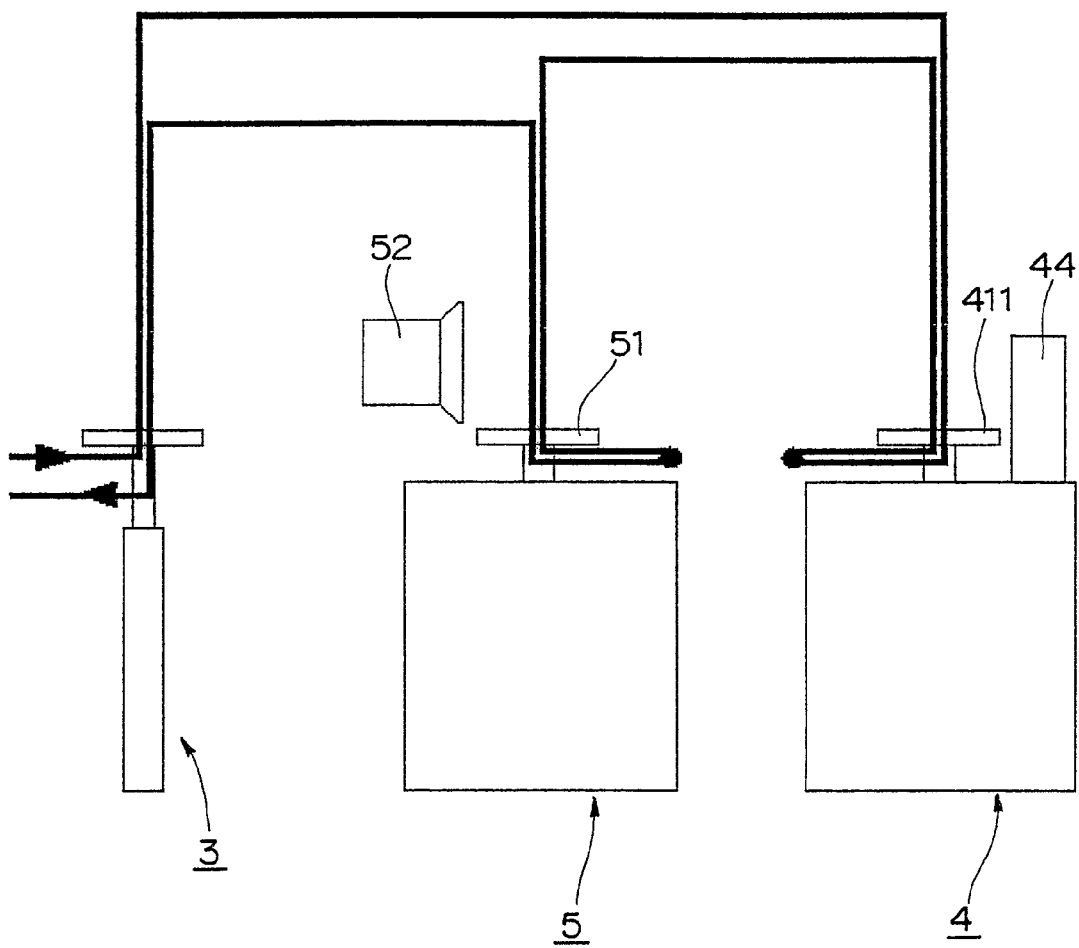
FIG. 22 A diagram showing operational paths of a carrying apparatus in the system shown in FIG. 21.

(1) As shown in FIG. 21, the stripping apparatus 6 and the water rinsing apparatus 7 may be removed from the system according to the first embodiment. FIG. 22 shows paths through which the treatment cell 9 in this case is carried. Also in this system, a surface-treated workpiece can be obtained.

Figure 23:
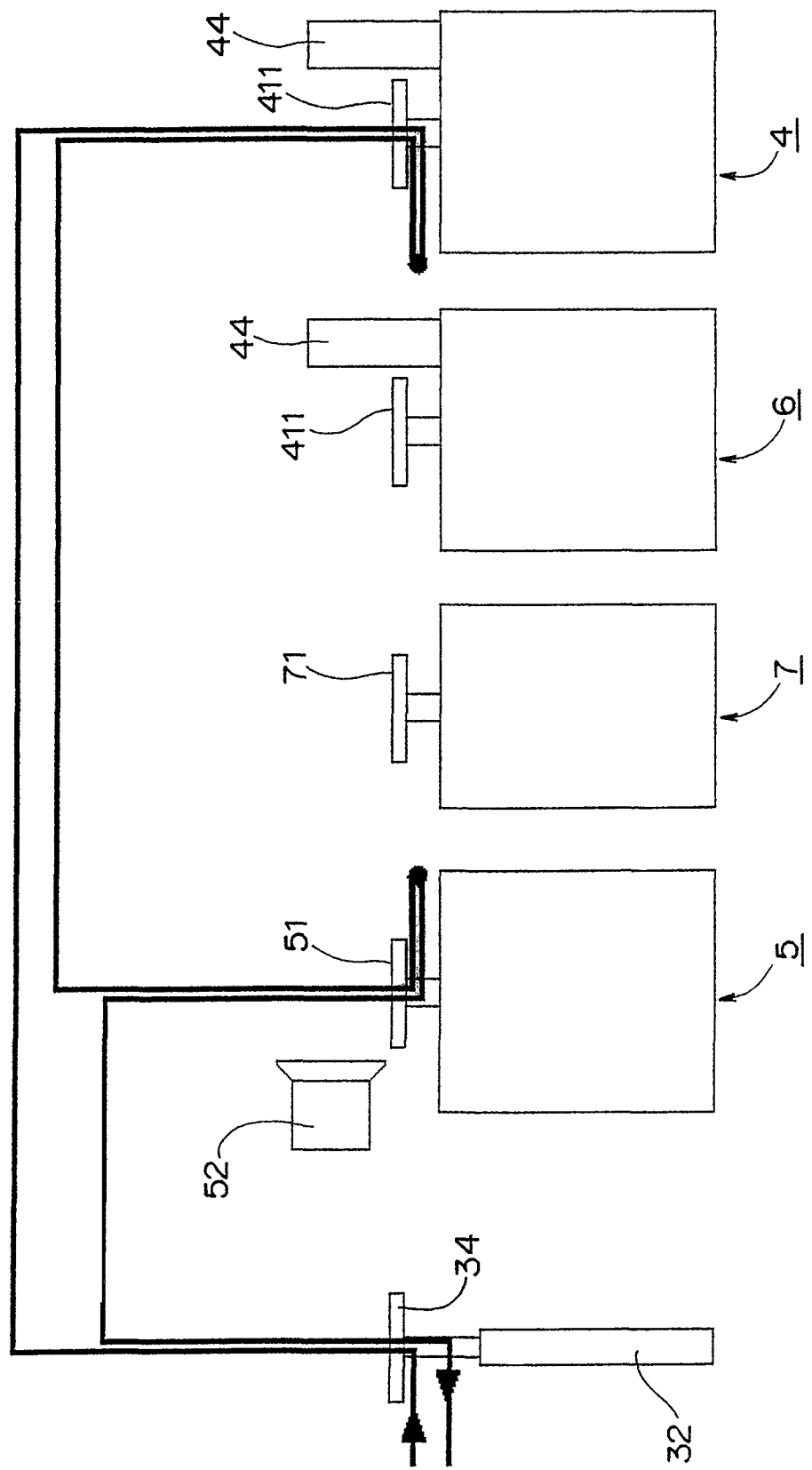
FIG. 23 A diagram showing operational paths of a carrying apparatus in a surface treatment system according to a second modified example.

(2) As shown in FIG. 23, the process may be brought to an end without carrying the treatment cell 9 to the stripping apparatus 6 and the water rinsing apparatus 7 in the system according to the first embodiment.

Figure 24:
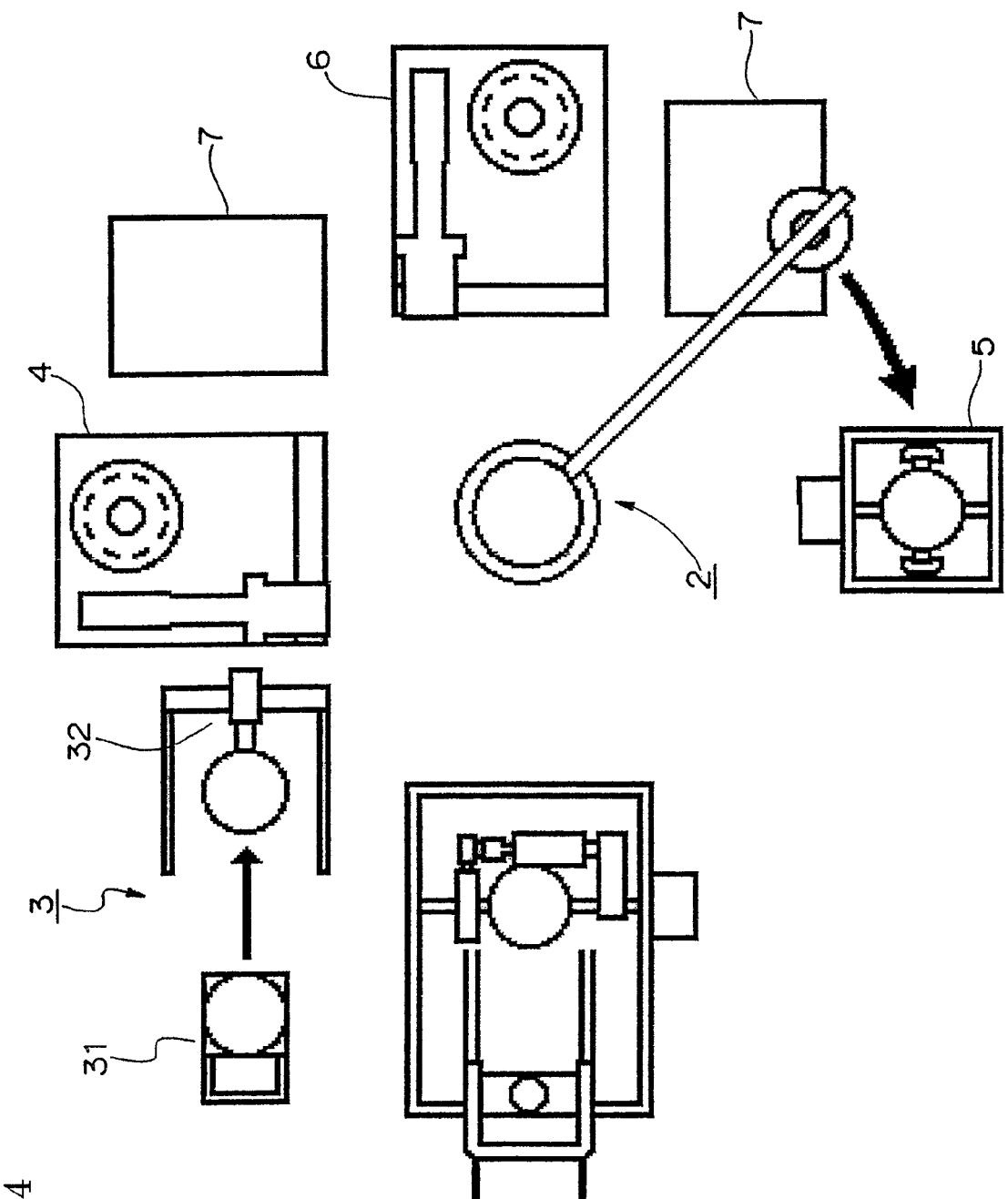
FIG. 24 A plan view of a surface treatment system according to a third modified example.
Figure 25:
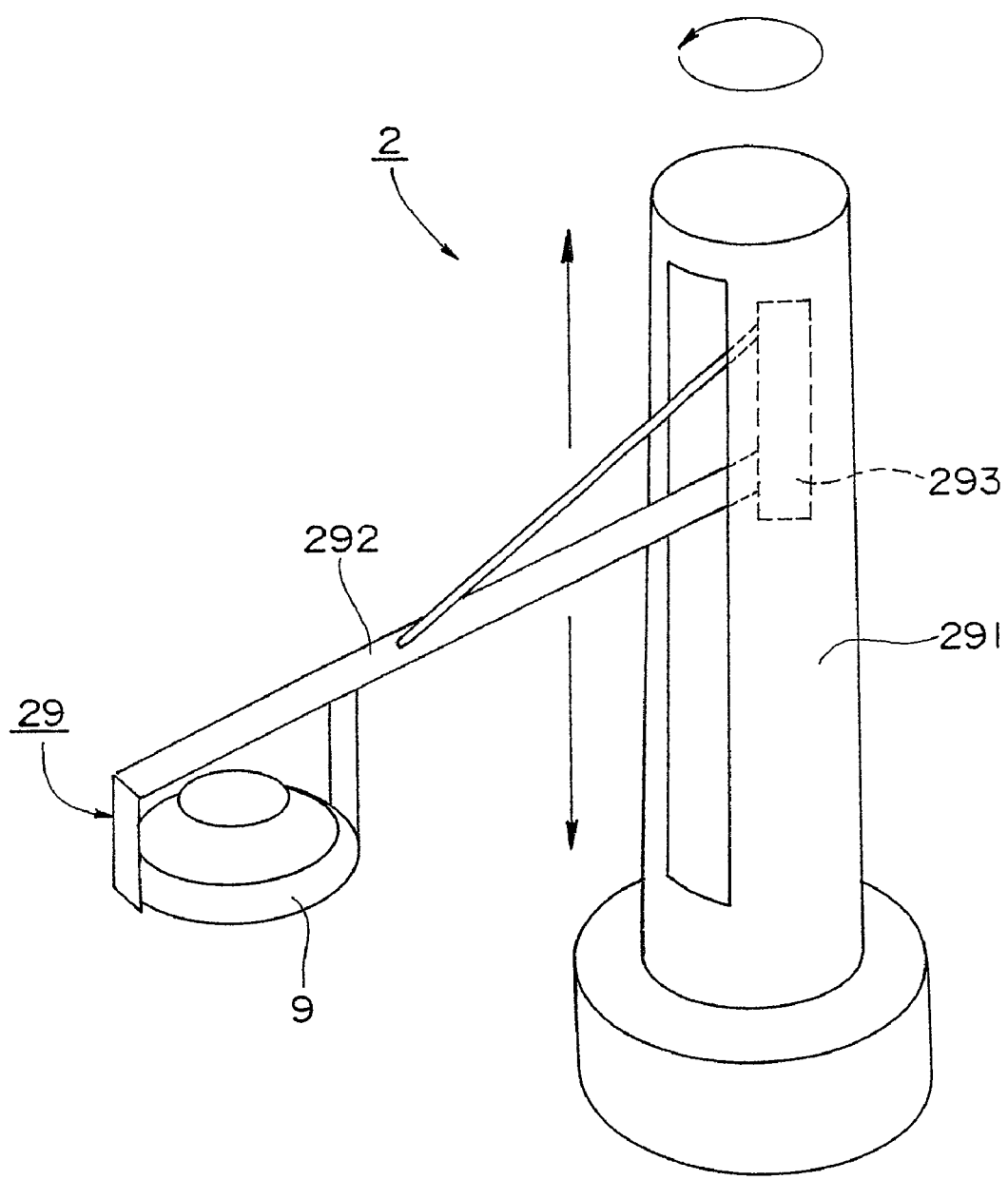
FIG. 25 A perspective view showing a carrying apparatus used in the system shown in FIG. 24.

(3) As shown in FIG. 24, the respective apparatuses 3, 4, 5, 6 and 7 of the first embodiment may be arranged in a circle in plan view. As shown in FIG. 25, the carrying apparatus 2 in this case includes: a rotation pole 291; an arm 292; a raising and lowering means 293 for the arm 292; and a holding portion 29, provided at a front end of the arm 292, for holding the treatment cell 9. The carrying apparatus 2 is formed so as to rotate the rotation pole 291 to rotate the arm 292, thereby carrying the treatment cell 9 held by the holding portion 29 to the respective apparatuses 3, 4, 5, 6 and 7. The raising and lowering means 293 is formed so as to raise and lower the arm 292, thereby raising and lowering the treatment cell 9 held by the holding portion 29.

Figure 26:
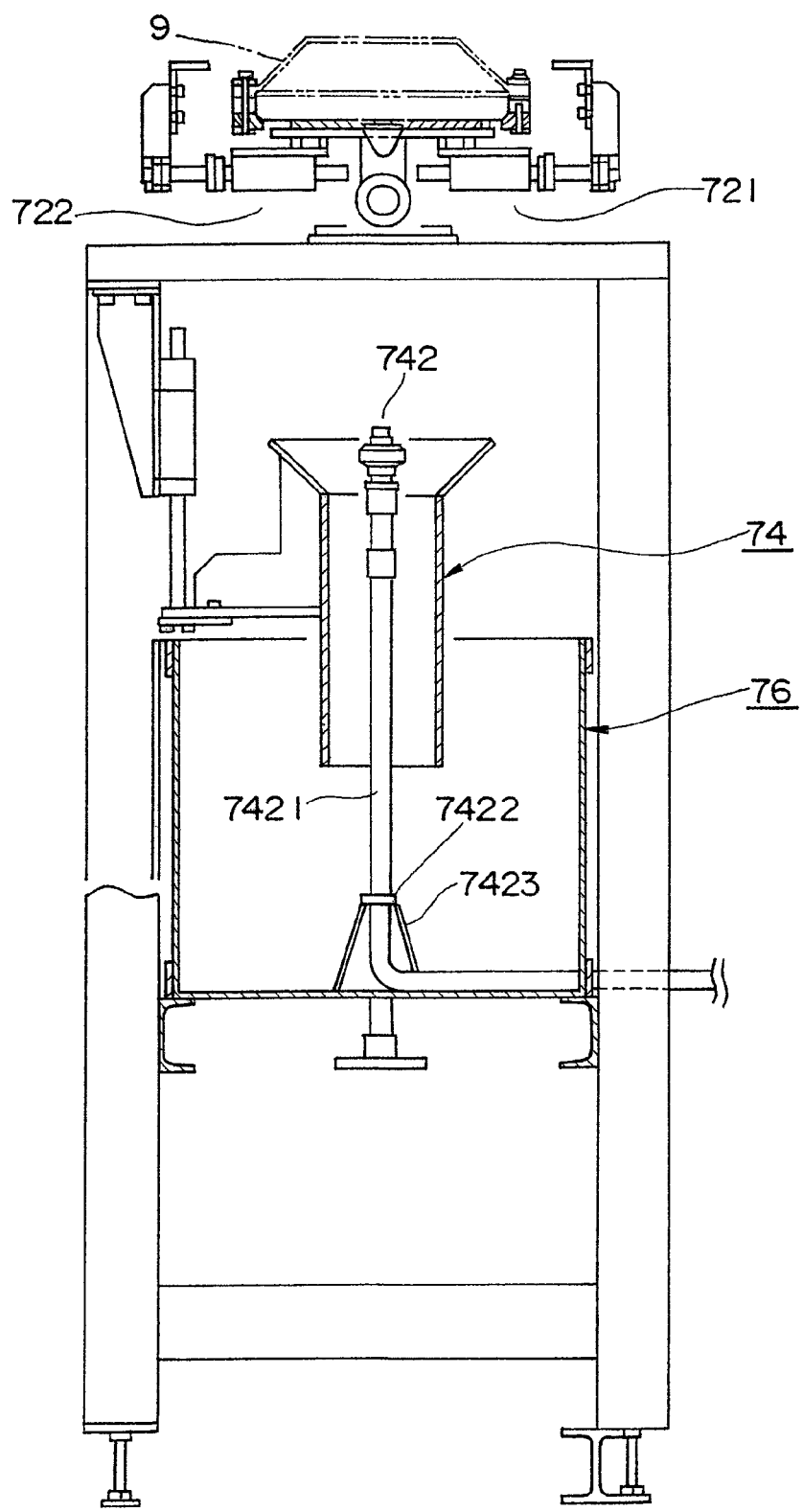
FIG. 26 A longitudinal cross-sectional view of a water rinsing apparatus according to a fourth modified example.

(4) As shown in FIG. 26, the sprinkler 742 may be provided to be fixed to the receiving vessel 76 in the water rinsing apparatus 7 of the first embodiment. Specifically, a pipe 7421 is extended perpendicularly from the sprinkler 742, supported by a ring 7422 and a support post 7423, and extended horizontally therefrom.

Figure 27:
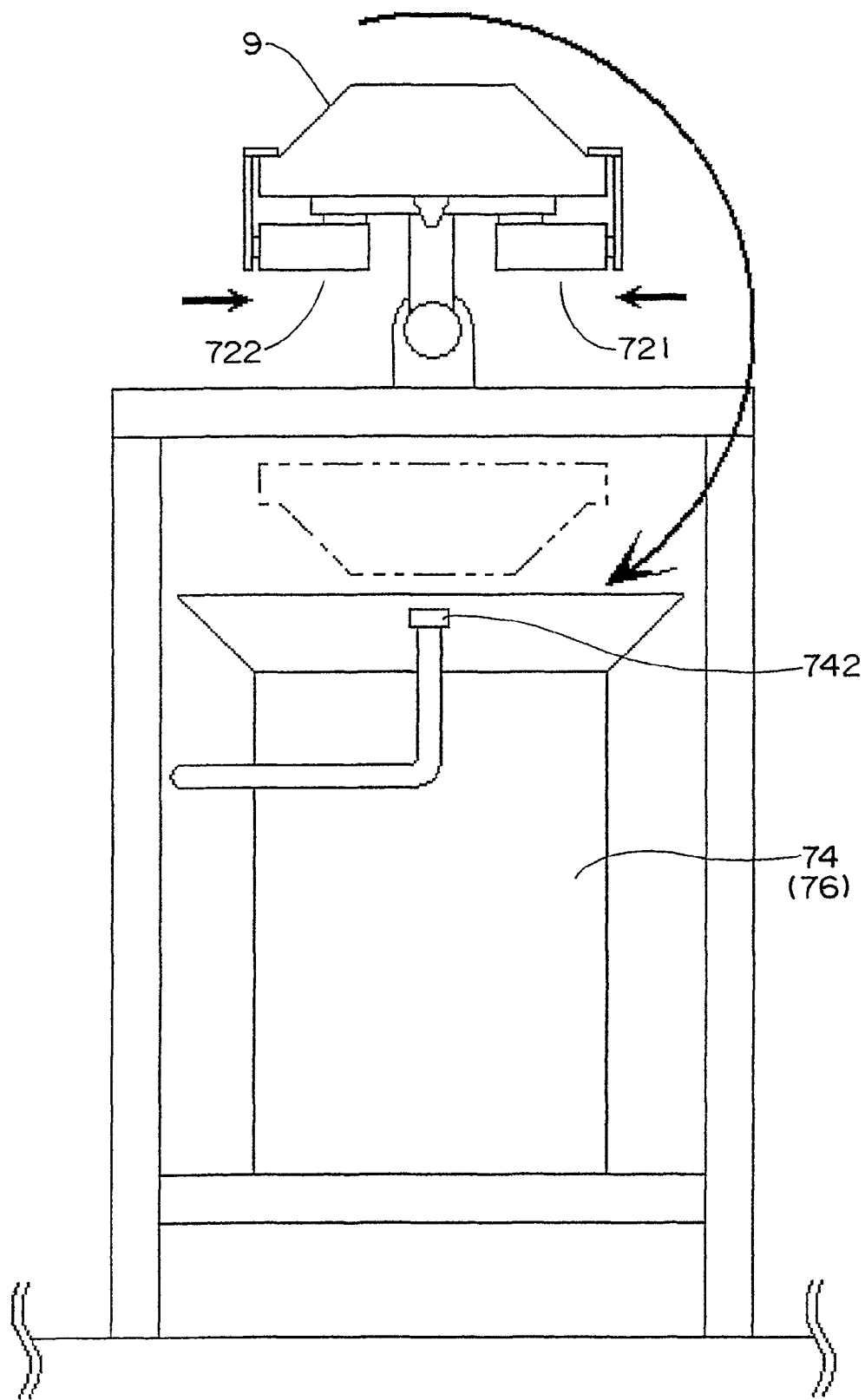
FIG. 27 A longitudinal cross-sectional view of a water rinsing apparatus according to a fifth modified example.

(5) As shown in FIG. 27, the hopper 74 may be a large one with a large diameter so as to be also served as the receiving vessel 76.

Figure 28:
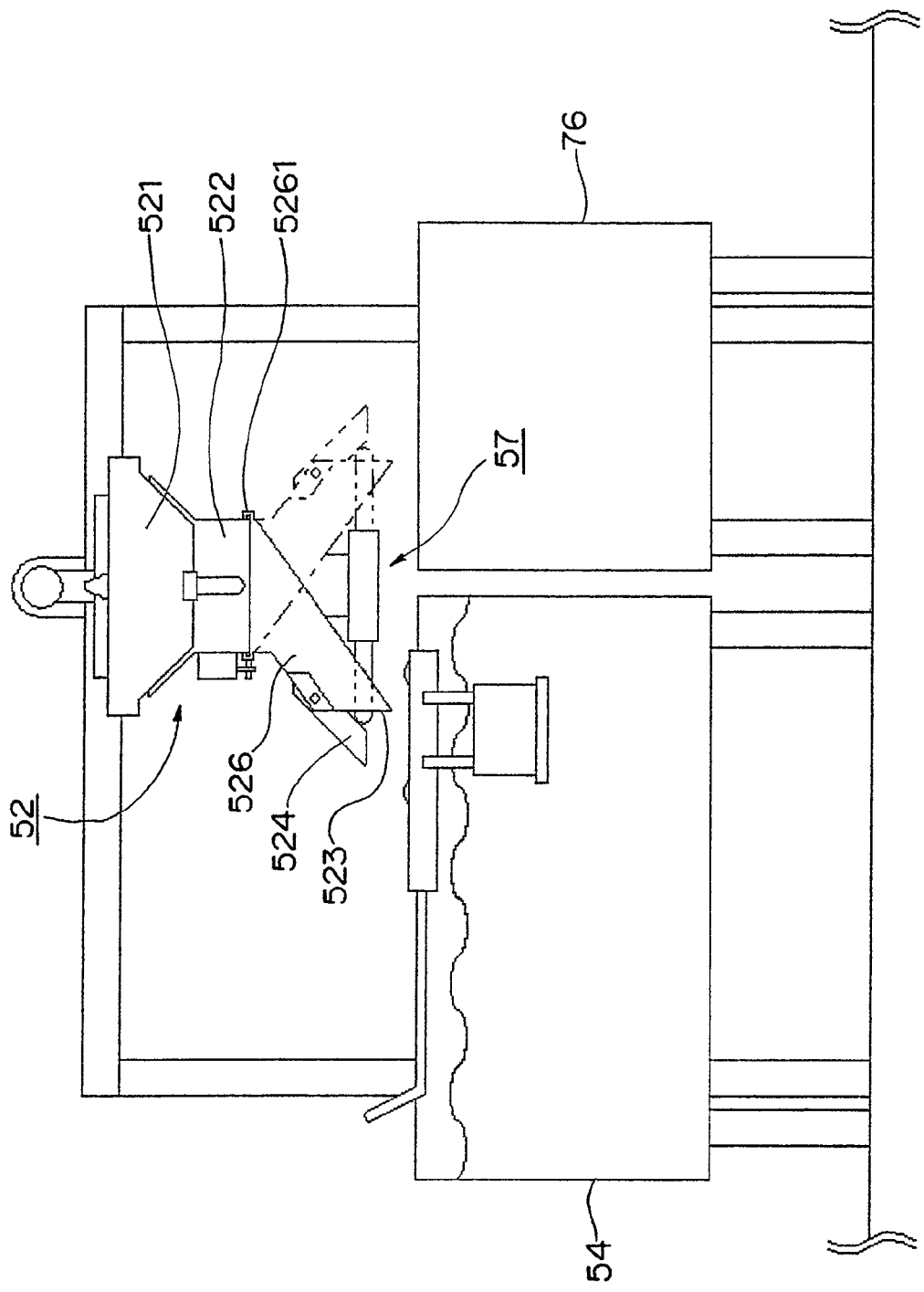
FIG. 28 A longitudinal cross-sectional view of a workpiece collection/water rinsing apparatus according to a sixth modified example.

(6) As shown in FIG. 28, the workpiece collection apparatus 5 and water rinsing apparatus 7 of the first embodiment may be provided integrally with each other. In this case, the collection vessel 54 and the receiving vessel 76 are arranged in parallel in the workpiece collection apparatus 5 of the first embodiment. Further, in the hopper 52, the discharge portion 526 is rotatable via a rotational joint 5261 with respect to the main body portion 522. Furthermore, the cylinder means 57 is provided integrally with the discharge portion 526. In this apparatus, the discharge portion 526 is actuated toward the collection vessel 54 in the workpiece collection step, and the discharge portion 526 is actuated toward the receiving vessel 76 in the water rinsing step.

(7) A plurality of the surface treatment apparatuses 4 may be provided. In such an embodiment, different surface treatments can be carried out by the respective surface treatment apparatuses 4, and accordingly, two or more treatment films can be formed on the surface of a workpiece.

Figure 29:
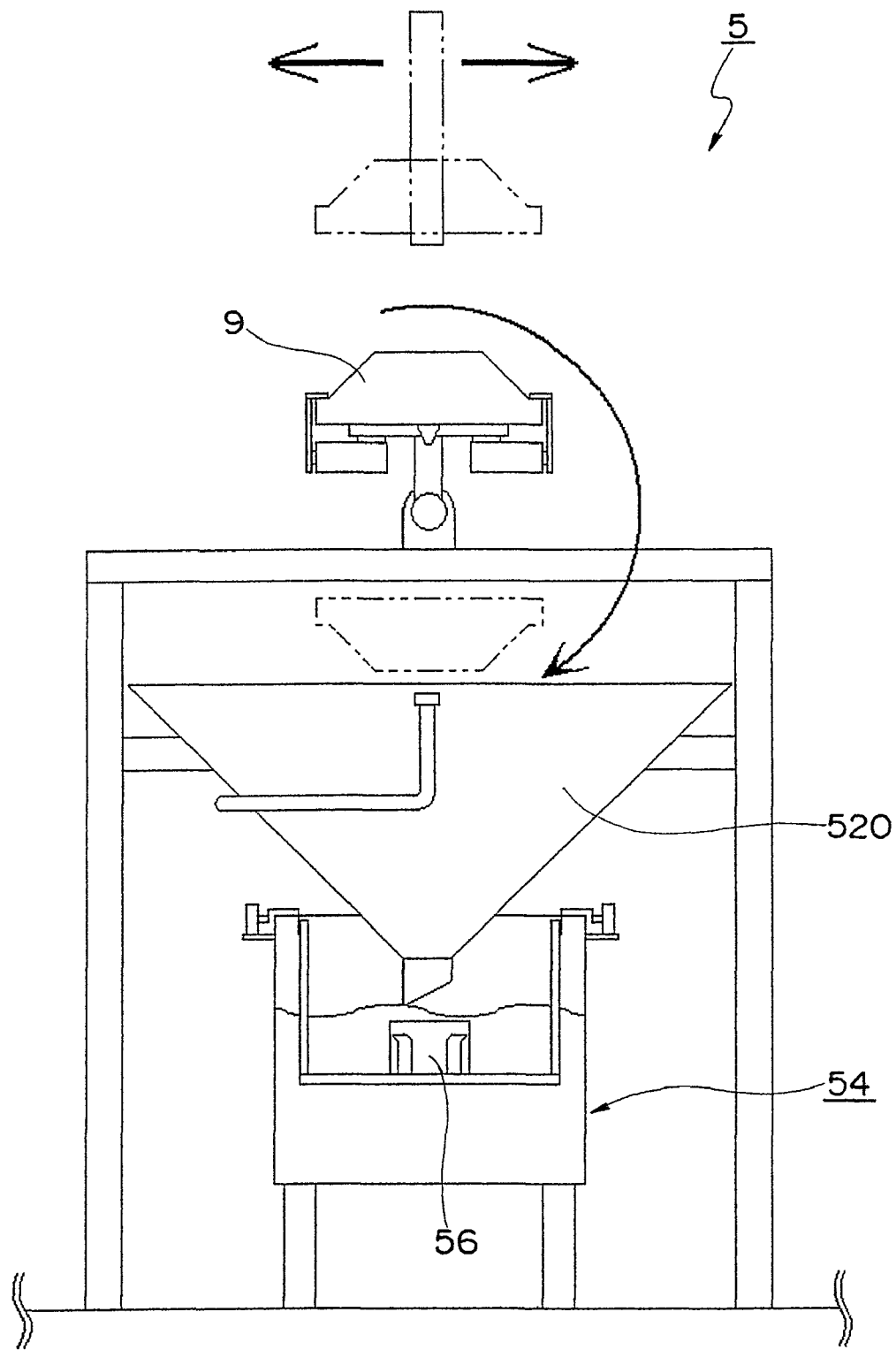
FIG. 29 A diagram of a workpiece collection apparatus according to a seventh modified example, which is equivalent to FIG. 17.

(8) As shown in FIG. 29, instead of the hopper 52 in the workpiece collection apparatus 5 of the first embodiment, a wide-mouth hopper 520 may be provided above the collection vessel 54. In such an embodiment, the inverting means 53 of the workpiece collection apparatus 5 can be formed using components common to the inverting means 73 of the water rinsing apparatus 7, and therefore, the number of types of components can be reduced to improve the productivity.

Figure 30:
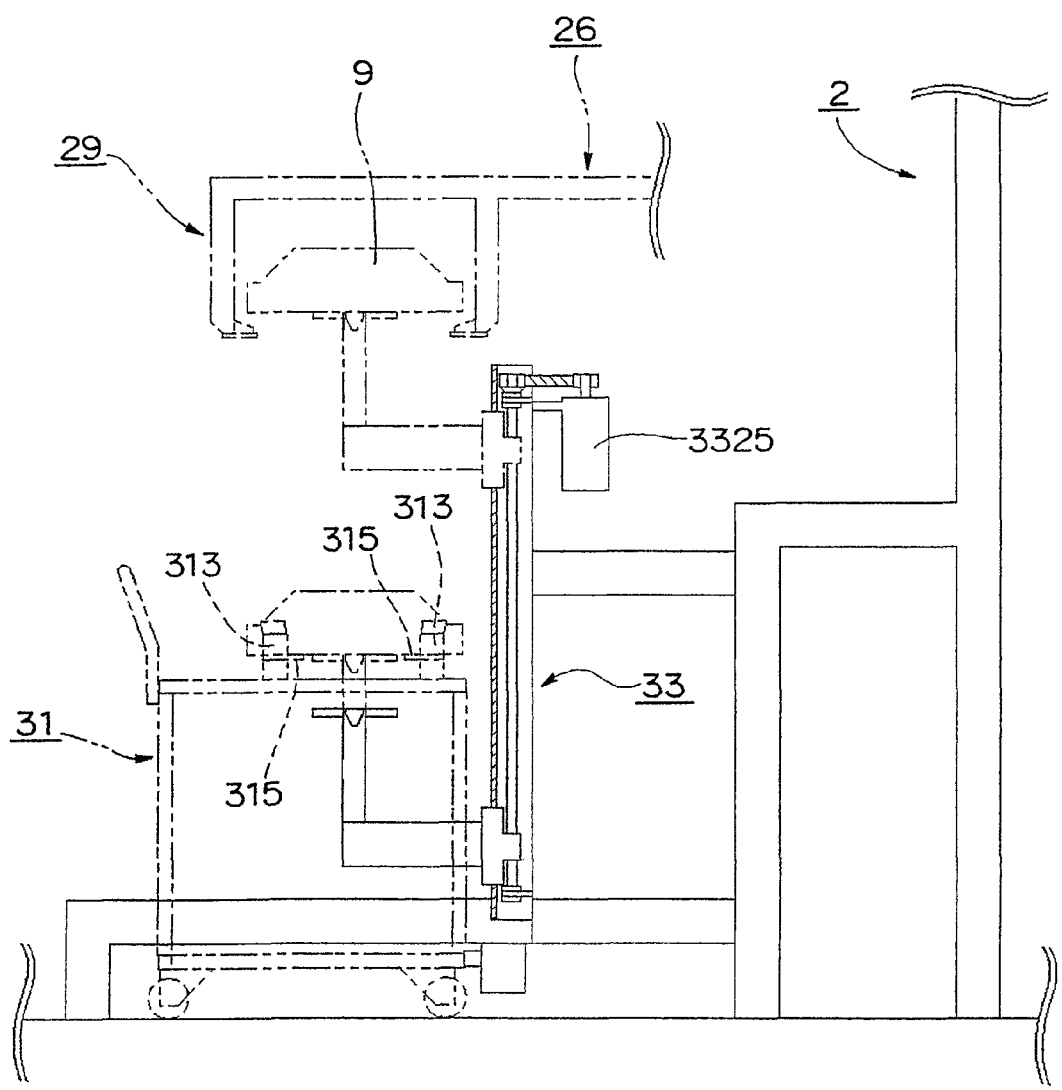
FIG. 30 A diagram of a carrying-in/out apparatus according to an eighth modified example, which is equivalent to FIG. 4.

(9) As shown in FIG. 30, the support pieces 313 of the carrying cart 31 of the first embodiment may each be provided with an inwardly facing horizontal plate 315. The treatment cell 9 is placed on the horizontal plates 315. In such an embodiment, the support pieces 313 are brought into contact with a lateral face of the treatment cell 9 placed on the horizontal plates 315, and therefore, the horizontal movement of the treatment cell 9 can be prevented with certainty.

INDUSTRIAL APPLICABILITY

The surface treatment system of the present invention can efficiently perform processes such as surface treatment on a workpiece, workpiece collection, and cleaning of the treatment cell in an assembly line manner, and thus has a high industrial utilization value.

The invention claimed is:

1. A workpiece surface treatment system for obtaining a surface-treated workpiece by sequentially carrying a treatment cell containing a workpiece to a series of apparatuses for operations in the respective apparatuses,
   the workpiece surface treatment system characterized by comprising:
   a carrying apparatus for sequentially carrying the treatment cell to a series of the apparatuses in the system;
   a carrying-in/out apparatus for carrying the treatment cell in the carrying apparatus, and for carrying the treatment cell out of the carrying apparatus;
   a surface treatment apparatus for performing a surface treatment on the workpiece by receiving the treatment cell from the carrying apparatus and supplying a surface treatment liquid to the inside of the treatment cell while rotating the treatment cell; and
   a workpiece collection apparatus for collecting the workpiece by receiving the treatment cell from the carrying apparatus, inverting the treatment cell, and squirting the inside of the treatment cell with water from below to flow out the workpiece.

2. The workpiece surface treatment system according to claim 1, further comprising:
   a stripping apparatus for performing a stripping process on an inner face of the treatment cell by receiving the treatment cell from the carrying apparatus, and supplying a stripping liquid to the inside of the treatment cell while rotating the treatment cell; and
   a water rinsing apparatus for water-rinsing the inside of the treatment cell by receiving the treatment cell from the carrying apparatus, inverting the treatment cell, and squirting the inside of the treatment cell with water from below.

3. The workpiece surface treatment system according to claim 1, comprising a plurality of the surface treatment apparatuses.

4. A workpiece collection apparatus characterized in that the apparatus comprises:
   a receiving plate on which a treatment cell is placed;
   a hopper for covering, from above, the treatment cell placed on the receiving plate; and
   inverting means for inverting the hopper covering the treatment cell, together with the receiving plate and the treatment cell, and
   the apparatus is formed so as to squirt the inside of the inverted treatment cell with water from an ejection part provided at the hopper, and allow a workpiece inside the treatment cell to be washed into the hopper and to be discharged from the hopper to a collection vessel, thereby collecting the workpiece.

* * * * *